US006889165B2

(12) United States Patent
Lind et al.

(10) Patent No.: US 6,889,165 B2
(45) Date of Patent: May 3, 2005

(54) APPLICATION SPECIFIC INTELLIGENT MICROSENSORS

(75) Inventors: Michael A. Lind, Kent, WA (US); Kevin L. Priddy, Upper Arlington, OH (US); Gary B. Morgan, Kennewick, WA (US); Jeffrey W. Griffin, Kennewick, WA (US); Richard W. Ridgway, Westerville, OH (US); Steven L. Stein, Bothell, WA (US)

(73) Assignee: Battelle Memorial Institute, Richland, WA (US)

(*) Notice: Subject to any disclaimer, the term of this patent is extended or adjusted under 35 U.S.C. 154(b) by 7 days.

(21) Appl. No.: 10/188,469

(22) Filed: Jul. 2, 2002

(65) Prior Publication Data

US 2003/0033032 A1 Feb. 13, 2003

Related U.S. Application Data

(60) Provisional application No. 60/302,563, filed on Jul. 2, 2001.

(51) Int. Cl.[7] .............................................. G06F 13/14
(52) U.S. Cl. ....................... 702/183; 702/182; 702/188; 702/190
(58) Field of Search ........................... 702/60, 61, 127, 702/182, 183, 188, 47, 52, 53, 54, 104, 116; 235/454, 440; 700/28; 709/217; 422/107, 108

(56) References Cited

U.S. PATENT DOCUMENTS

| 3,961,323 A | 6/1976 | Hartkorn .................... 340/280 |
| 4,283,031 A | 8/1981 | Finch ......................... 246/128 |
| 4,468,656 A | 8/1984 | Clifford ...................... 340/539 |
| 4,521,685 A | 6/1985 | Rebman ...................... 250/229 |
| 4,562,554 A | 12/1985 | Stixrud et al. .............. 364/900 |
| 4,720,641 A | 1/1988 | Faini .......................... 307/18 |
| 4,743,954 A | 5/1988 | Brown ........................ 357/25 |

(Continued)

FOREIGN PATENT DOCUMENTS

| EP | 0 420 296 A1 | 4/1991 |
| EP | 0 450 829 A1 | 10/1991 |
| EP | 0 511 807 A1 | 11/1992 |
| EP | 0 351 988 B1 | 1/1993 |
| EP | 0 733 880 A1 | 9/1996 |
| GB | 2 342 998 A1 | 4/2000 |
| WO | WO 93/01449 | 1/1993 |

OTHER PUBLICATIONS

Michael Lind, "*Application Specific Intelligent Microsensor (ASIM)*", Battelle Presentation, Oct. 30, 2000.
Michael Ross, James E. Segars, William Cummings, Ravishanke V. Gampa, "*Methods for Shipping Freight*", U.S. Patent Publication, Nov. 15, 2001.
Jorge D. Ortiz–Fuentes and Mikel L. Forcada, "*A comparison Recurrent Netural Network Architectures for Digital Equalization,*" Dept. Llenguateges I Sistemes Informatics (Spain), (Dated at least as early as Dec. 2001).

(Continued)

Primary Examiner—Patrick Assoud
Assistant Examiner—Felix Suarez
(74) Attorney, Agent, or Firm—Woodard, Emhardt, Moriarty McNett & Henry LLP

(57) ABSTRACT

An intelligent microsensor module (10, 100, 210, 300, 355, 410) is provided that can fuse data streams from a variety of sources and then locally determine the current state of the environment in which the intelligent microsensor is placed. The resultant state rather than raw data is communicated to the outside world when the microsensor is queried. The intelligent microsensor module (10, 100, 210, 300, 355, 410) of the present invention can locally determine and execute an action to be taken based on the determined state of the environment. The module (10, 100, 210, 300, 355, 410) can be readily reconfigured for multiple applications.

40 Claims, 13 Drawing Sheets

U.S. PATENT DOCUMENTS

| | | | |
|---|---|---|---|
| 4,860,243 A | 8/1989 | Ueno et al. | 364/807 |
| 4,975,961 A | 12/1990 | Sakoe | 381/43 |
| 4,979,124 A | 12/1990 | Sachse et al. | 364/507 |
| 5,005,142 A | 4/1991 | Lipchak et al. | 364/550 |
| 5,083,288 A | 1/1992 | Somlyody et al. | 364/552 |
| 5,122,976 A | 6/1992 | Bellows et al. | 364/550 |
| 5,153,923 A | 10/1992 | Matsuba et al. | 382/14 |
| 5,165,010 A | 11/1992 | Masuda et al. | 395/27 |
| 5,176,358 A | 1/1993 | Bonne et al. | 251/30.05 |
| 5,182,794 A | 1/1993 | Gasperi et al. | 395/23 |
| 5,193,185 A | 3/1993 | Lanter | 395/600 |
| 5,218,440 A | 6/1993 | Mathur | 358/213.27 |
| 5,267,347 A | 11/1993 | Isoda et al. | 395/25 |
| 5,276,770 A | 1/1994 | Castelaz | 395/23 |
| 5,293,455 A | 3/1994 | Castelaz | 395/24 |
| 5,295,197 A | 3/1994 | Takenaga et al. | 382/14 |
| 5,299,287 A | 3/1994 | Tsuruta et al. | 395/51 |
| 5,333,125 A | 7/1994 | Yamamoto | 369/44.34 |
| 5,347,274 A | 9/1994 | Hassett | 340/988 |
| 5,359,674 A | 10/1994 | van der Wal | 382/41 |
| 5,388,187 A | 2/1995 | Isoda et al. | 395/25 |
| 5,416,711 A | 5/1995 | Gran et al. | 364/436 |
| 5,432,370 A | 7/1995 | Kitamura et al. | 257/339 |
| 5,451,500 A | 9/1995 | Stapleton | 435/6 |
| 5,459,675 A | 10/1995 | Gross et al. | 364/492 |
| 5,469,369 A | 11/1995 | Rose-Pehrsson et al. | 364/497 |
| 5,479,569 A | 12/1995 | Kyuma et al. | 395/11 |
| 5,490,490 A | 2/1996 | Weber et al. | 123/697 |
| 5,503,805 A | 4/1996 | Sugarman et al. | 422/131 |
| 5,511,553 A | 4/1996 | Segalowitz | 128/696 |
| 5,513,098 A | 4/1996 | Spall et al. | 364/158 |
| 5,528,228 A | 6/1996 | Wilk | 340/686 |
| 5,537,511 A | 7/1996 | DeAngelis et al. | 395/22 |
| 5,552,772 A | 9/1996 | Janky | 340/573 |
| 5,554,339 A | 9/1996 | Cozzette et al. | 422/50 |
| 5,565,858 A | 10/1996 | Guthrie | 340/825.35 |
| 5,566,270 A | 10/1996 | Albesano et al. | 395/2.41 |
| 5,585,069 A | 12/1996 | Zanzucchi et al. | 422/100 |
| 5,587,128 A | 12/1996 | Wilding et al. | 422/50 |
| 5,604,840 A | 2/1997 | Asai et al. | 395/11 |
| 5,606,313 A | 2/1997 | Allen et al. | 340/825.54 |
| 5,615,380 A | 3/1997 | Hyatt | 395/800 |
| 5,638,492 A | 6/1997 | Maeda et al. | 395/50 |
| 5,659,195 A | 8/1997 | Kaiser et al. | 257/415 |
| 5,675,713 A | 10/1997 | Batten, Jr. | 395/24 |
| 5,690,893 A | 11/1997 | Ozawa et al. | 422/67 |
| 5,715,178 A | 2/1998 | Scarola et al. | 364/551 |
| 5,730,124 A | 3/1998 | Yamauchi | 128/630 |
| 5,741,462 A | 4/1998 | Nova et al. | 422/68.1 |
| 5,754,436 A | 5/1998 | Walsh et al. | 364/483 |
| 5,761,090 A | 6/1998 | Gross et al. | 364/551.01 |
| 5,761,386 A | 6/1998 | Lawrence et al. | 395/23 |
| 5,762,881 A | 6/1998 | Harness et al. | 422/132 |
| 5,763,943 A | 6/1998 | Baker et al. | 257/686 |
| 5,789,659 A | 8/1998 | Williams | 73/23.2 |
| 5,801,317 A | 9/1998 | Liston et al. | 73/863.81 |
| 5,808,366 A | 9/1998 | Song | 257/794 |
| 5,818,738 A | 10/1998 | Effing | 364/579 |
| 5,819,235 A | 10/1998 | Tamai et al. | 705/23 |
| 5,837,196 A | 11/1998 | Pinkel et al. | 422/55 |
| 5,851,489 A | 12/1998 | Wolf et al. | 422/82.02 |
| 5,856,174 A | 1/1999 | Lipshutz et al. | 435/286.5 |
| 5,871,928 A | 2/1999 | Fodor et al. | 435/6 |
| 5,872,721 A | 2/1999 | Huston et al. | 364/510 |
| 5,874,046 A | 2/1999 | Megerle | 422/68.1 |
| 5,874,219 A | 2/1999 | Rava et al. | 435/6 |
| 5,879,292 A | 3/1999 | Sternberg et al. | 600/300 |
| 5,885,837 A | 3/1999 | Winkler et al. | 435/91.1 |
| 5,887,049 A | 3/1999 | Fossum | 378/98.8 |
| 5,892,441 A | 4/1999 | Woolley et al. | 340/539 |
| 5,917,433 A | 6/1999 | Keillor et al. | 340/989 |
| 5,922,591 A | 7/1999 | Anderson et al. | 435/287.2 |
| 5,936,523 A | 8/1999 | West | 340/545.6 |
| 5,937,202 A | 8/1999 | Crosetto | 395/800.19 |
| 5,939,982 A | 8/1999 | Gagnon et al. | 340/539 |
| 5,956,702 A | 9/1999 | Matsuoka et al. | 706/22 |
| 5,957,854 A | 9/1999 | Besson et al. | 600/509 |
| 5,965,410 A | 10/1999 | Chow et al. | 435/91.2 |
| 5,980,704 A | 11/1999 | Cherukuri et al. | 204/269 |
| 6,001,571 A | 12/1999 | Mandecki | 435/6 |
| 6,015,880 A | 1/2000 | Baldeschwieler et al. | 530/333 |
| 6,023,610 A | 2/2000 | Wood, Jr. | 455/101 |
| 6,025,601 A | 2/2000 | Trulson et al. | 250/461.2 |
| 6,028,189 A | 2/2000 | Blanchard | 536/25.3 |
| 6,028,293 A | 2/2000 | Nagle et al. | 219/432 |
| 6,031,454 A | 2/2000 | Lovejoy et al. | 340/539 |
| 6,043,080 A | 3/2000 | Lipshutz et al. | 435/287.2 |
| 6,046,678 A | 4/2000 | Wilk | 340/686.1 |
| 6,051,377 A | 4/2000 | Mandecki | 435/6 |
| 6,061,609 A | 5/2000 | Kanoi et al. | 700/291 |
| 6,068,818 A | 5/2000 | Ackley et al. | 422/50 |
| 6,072,524 A | 6/2000 | Davis et al. | 348/164 |
| 6,088,785 A | 7/2000 | Hudson et al. | 712/35 |
| 6,092,018 A | 7/2000 | Puskorius et al. | 701/110 |
| 6,103,479 A | 8/2000 | Taylor | 435/7.2 |
| 6,107,044 A | 8/2000 | Nikiforov | 435/6 |
| 6,110,426 A | 8/2000 | Shalon et al. | 422/68.1 |
| 6,114,122 A | 9/2000 | Besemer et al. | 435/6 |
| 6,129,828 A | 10/2000 | Sheldon, III et al. | 204/518 |
| 6,131,444 A | 10/2000 | Wu et al. | 73/116 |
| 6,132,580 A | 10/2000 | Mathies et al. | 204/453 |
| 6,136,269 A | 10/2000 | Winkler et al. | 422/61 |
| 6,140,044 A | 10/2000 | Besemer et al. | 435/6 |
| 6,156,501 A | 12/2000 | McGall et al. | 435/6 |
| 6,168,948 B1 | 1/2001 | Anderson et al. | 435/287.2 |
| 6,169,981 B1 | 1/2001 | Werbos | 706/23 |
| 6,178,530 B1 | 1/2001 | Aman et al. | 714/702 |
| 6,178,821 B1 | 1/2001 | Savkar et al. | 73/650 |
| 6,188,353 B1 | 2/2001 | Mitchell | 342/386 |
| 6,197,503 B1 | 3/2001 | Vo-Dinh et al. | 435/6 |
| 6,197,595 B1 | 3/2001 | Anderson et al. | 436/180 |
| 6,203,989 B1 | 3/2001 | Goldberg et al. | 435/6 |
| 6,203,990 B1 | 3/2001 | Fahy | 435/6 |
| 6,207,960 B1 | 3/2001 | Stern | 250/458.1 |
| 6,208,247 B1 * | 3/2001 | Agre et al. | 340/539 |
| 6,209,144 B1 | 4/2001 | Carter | 2/458 |
| 6,268,798 B1 | 7/2001 | Dymek et al. | 340/573.1 |
| 6,272,480 B1 | 8/2001 | Tresp et al. | 706/44 |
| 6,292,738 B1 | 9/2001 | Feldkamp et al. | 701/106 |
| 6,292,791 B1 | 9/2001 | Su et al. | 706/23 |
| 6,300,903 B1 | 10/2001 | Richards et al. | 342/450 |
| 6,329,139 B1 | 12/2001 | Nova et al. | 435/6 |
| 6,366,622 B1 * | 4/2002 | Brown et al. | 375/322 |
| 6,422,061 B1 * | 7/2002 | Sunshine et al. | 73/29.01 |
| 6,447,448 B1 * | 9/2002 | Ishikawa et al. | 600/300 |
| 6,594,524 B2 * | 7/2003 | Esteller et al. | 607/45 |
| 2002/0050518 A1 * | 5/2002 | Roustaei | 235/454 |

OTHER PUBLICATIONS

G. William Nickerson and Richard W. Lally, "*An Intelligent Component Health Monitoring System: A Building Block For A Distributed Approach to Machinery Health Assessment,*" Oceana Sensor Technologies, Inc. ((Dated at least as early as Jun. 2001).

Dr. Sri Kumar, "*Sensor Information Technology*", DARPA ITO Information Technology Office (Dated at least as early as Jun. 2001).

Michael G. Corr and C.M. Okino, "*Networking Reconfigurable Smart Sensors*", Thayer School of Engineering (Dated at least as early as Dec. 2001).

John C. Eidson and Stan P. Woods, "A Research Prototype of a Networked Smart Sensor System," Hewlett Packard Measurement Systems Dept. Instruments and Photonics Laboratory, Aug. 1995.

C. Cretu, J.H. Correia, S.H. King, M. Bartek and R.F. Wolffenbuttel, "Flexible Architecture for Microinstrumentation Systems in Silicon", Delft University, Netherlands (Dated at least as early as Dec. 2001.

Ronald J.W.T. Tangelder, Guido Diemel, Hans G. Kerkhoff, "Smart Sensor System Application: An Integrated Compas", MESA Research Institute, 1997.

Andrew Mason, Navid Yazdi, Abhueet V. Chavan, Khalil Najafi, Kensall D. Wise, "A Generic Multielement Microsystem for Portable Wireless Application," Proceedings of the IEEE, vol. 86, No. 5, Aug. 1988.

Henry Baltes, Oliver Paul and Oliver Brand, "Micromachined Thermally Based CMOS Microsensors," Proceedings of the IEEE, vol. 86, No. 8, Aug. 1998.

Steve Smith, Mark Buckner and Mike Moore, "Presentation: Distributed Synchronous Multidrop Systems—Proposed Concept IEEE 1451.3 Standard," IEEE P1451.3/4/ Oct. 23–24, 1998 meeting.

Oceana Sensor Technologies, "Oceana Sensor Technologies announces the release of ICHM™2000—Distributed processor for Machinery Health Monitoring," Sep. 13, 2000.

Jeffrey Hightower and Gaetano Borriello, "Location Sensing Techniques," University of Washington, pp. 57–66, Jul. 30, 2001.

Nirupama Bulusu, John Heidemann, Deborah Estrin, "GPS–less Low Cost Outdoor Localization for Very Small Devices," University of Southern California/Information Science Institute, 2000.

Jeffrey Hightower and Gaetano Borriello, "Location Systems for Ubiquitous Computing," University of Washington, Computer Science and Engineering, Aug. 24, 2001.

Ronald E. Shaffer, "Chemical Sensor Pattern Recognition System and method using a Self–Training Neural Network Classifier with Automated Outlier Detection," U.S. Patent Publication, Aug. 9, 2001.

Nathan Lewis, Erik Severin, Bernard Wong, David Kelso, Beth Munoz, "Trace Level Detection of Analytes using Artificial Olfactometry," U.S. Patent Publication Nov. 15, 2001.

James L. Richards, "System and Method for Monitoring Assets, Objects, People and Animals Utilizing Impulse Radio," U.S. Patent Publication, Jan. 3, 2002.

Birgit Kreller and Jens Hartman, "The Field Trial Scenario of an Inter–Modal, End–to–End And Real–Time Tracking and Tracing System," At least as early as Dec. 2001.

F. Paillet, D. Mercier, T.M. Bernard and E. Senn, "Low Power Issues in a Digital Programmable Artificial Retina", Perception for Robotics Dept. (Dated at least as early as Dec. 2001).

J.H. Correia, E. Cretu, M. Bartek and R.F. Wolffenbuttel, "A Low–Power Low–Voltage Digital Bus Interface for MCM–Based Microsystems," Delft University of Technology, (Dated at least as early as Dec. 2001).

Wai–Chi Fang, Guang Yang, Bedabrata Pain and Bing J. Sheu, "A Low Power Smart Vision System on Active Pixel Sensor Integrated with programmable Neural Processor," IEEE Conference on Computer Design, Oct. 1997.

Carla Ellis, Alvin Lebeck and Amin Vahdat, "System Support for Energy Management in Mobile and Embedded Workloads: A White Paper," Department of Computer Science, Duke University, Oct. 1999.

Amit Sinha and Anatha Chandrakasan, "Dynamic Power Management in Wireless Sensor Networks," IEEE Design and Test of Computers, Mar.–Apr. 2001.

Weilan Wu, Stan C. Kwasny, Barry L. Kalman and E. Maynard Engebretson, "Identifying Language from Raw Speech—An Application of Recurrent Neural Networks," Department of Computer Science– Washington University, At least as early as Dec. 2001.

Adam T. Woolley, Kaiqin Lao, Alexander N. Glazer, and Richard A. Mathies, "Capillary Electrophoresis Chips with Integrated Electrochemical Detection," pp. 684–688, Dept. of Chemistry & Dept. of Molecular and Cell Biology, University of California, 1998.

Joseph Wang, Baomin Tian and Eskill Sahlin, "Integrated Electrophoresis Chips/Amperometric Detection with Sputtered Gold Working Electrodes," pp. 3901–3904, Dept. of Chemistry & Biochemistry, New Mexico State University, 1999.

Doug Call, Sharon Cebula, Jennie Stults, Derek Weaver, Derek Hopkins, Jim Follansbee, and Barbara Seider, "Biochemical and Biomolecular Sensing," vol. 4200, The International Society of Optical Engineering, Nov. 2000.

* cited by examiner

APPLICATION SPECIFIC INTELLIGENT MICROSENSORS

CROSS-REFERENCE TO RELATED APPLICATIONS

The present application claims the benefit of U.S. Provisional Patent Application No. 60/302,563 filed Jul. 2, 2001, which is hereby incorporated by reference.

BACKGROUND OF THE INVENTION

The present inventions relate to intelligent microsensors. More particularly, the present inventions relate to intelligent microsensors that can fuse data streams from a variety of sources and locally process the data to determine the current state of the environment in which the intelligent microsensor is placed.

Microsensors are used in the prior art to detect certain parameters and to report the raw data detected to a remote location for processing. Some dedicated purpose sensor units, such as shown in U.S. Pat. No. 5,511,553 to Segalowitz (the '553 patent), are used to detect multiple physiological parameters from a patient. Some embodiments of the '553 patent describe the data detection and processing as being completed "on the patient" at the patient's end. However, the invention of the '553 patent is not readily reconfigurable for other uses.

What is needed is a general purpose smart sensor that can fuse data from multiple types of sensors, processing the sensor data locally. What is further needed is an intelligent smart sensor module which can analyze the locally processed data and, if desired, react to the resultant data to adjust the environment of the smart sensor module and/or forward the resultant data to a remote location. What is additionally needed is an intelligent microsensor package that can be standardized and easily adapted and/or reconfigured for multiple different uses. These objects, and others, are satisfied by Applicant's present inventions disclosed here below.

SUMMARY OF THE INVENTION

One embodiment of the present invention relates to a unique sensing technique. Other embodiments include unique methods, systems, devices, and apparatus for sensing one or more characteristics. A further embodiment of the present invention is directed towards a modular, general purpose sensor unit. The modular sensor unit includes a sensor array layer, a processor and control layer, and a power layer. The sensor array layer receives and conditions data from at least two sensors which can be the same type or different types. The general purpose intelligent processor and control layer processes the conditioned data and produces output data derived from the conditioned data, which is different, at least in part, from the conditioned data. Additionally, the processor and control layer includes a reprogrammable memory for storing application specific software to control the operation of the processor and control layer. The power layer provides power to the sensor array layer and the intelligence and processor control layer. The sensor array layer, the processor and control layer, and power layer are layered to form a unitary smart sensor module.

In some other embodiments, a communications layer is additionally included. The communications layer can be used to receive new software to reprogram the smart sensor module for a different application. In another embodiment, a network of smart sensor modules is provided.

One object is to provide a unique sensing technique.

Another object is to provide a unique method, system, device, or apparatus for sensing one or more characteristics.

Further embodiments, forms, benefits, aspects, features, objects and advantages of the present invention will be apparent from the following description.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF SELECTED EMBODIMENTS

Figure 1:
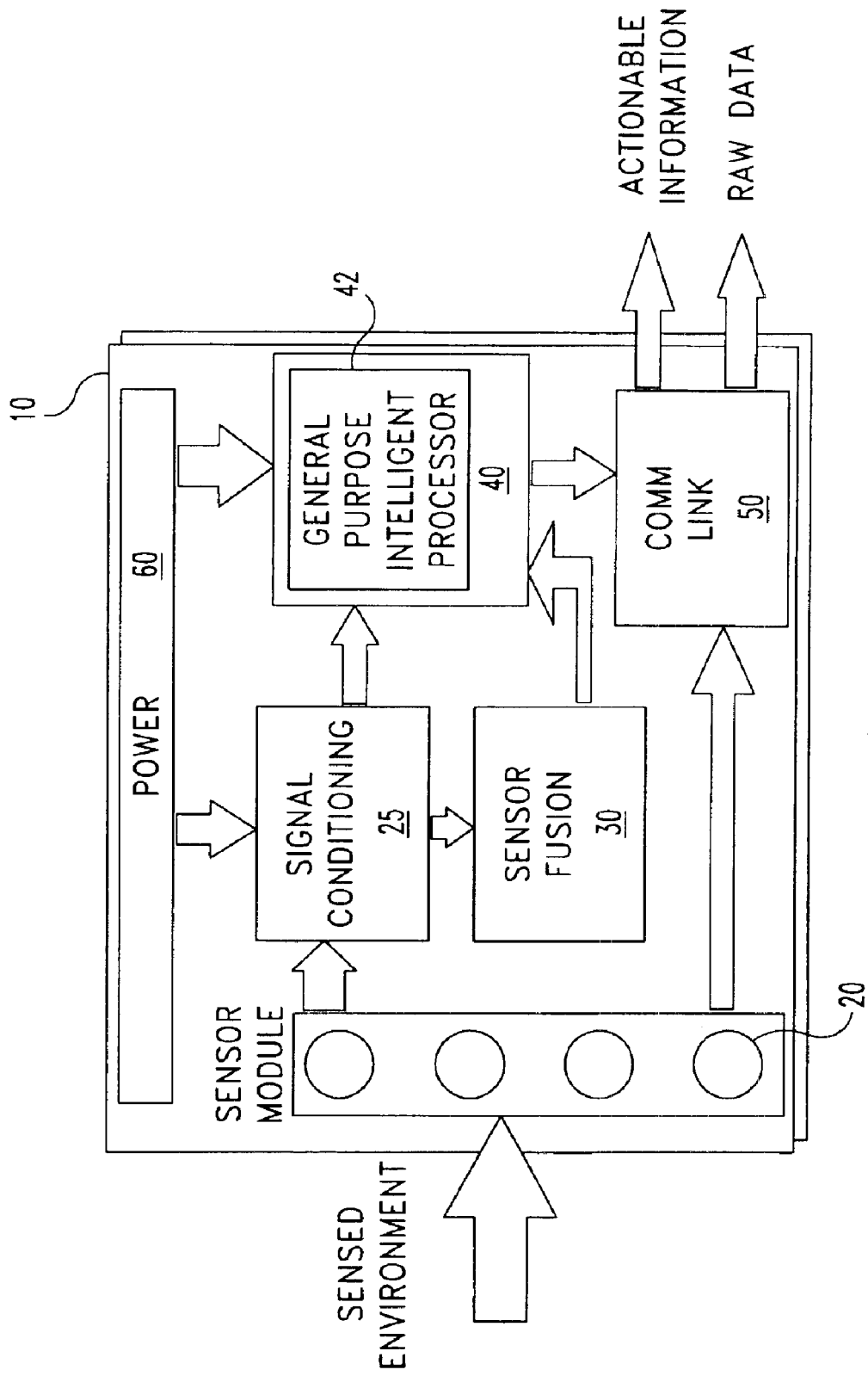
FIG. 1 shows a block diagram of a smart sensor module in accordance with one embodiment of the present invention.

For the purposes of promoting an understanding of the principles of the inventions, reference will now be made to the embodiments illustrated in the drawings and specific language will be used to describe the same. It will nevertheless be understood that no limitation of the scope of the inventions is thereby intended. Any alterations and further modifications of the principles of the inventions as illustrated or described herein are contemplated as would normally occur to one skilled in the art to which the inventions relate.

Certain embodiments of the present inventions relate to a smart sensor design that is very general in nature and is capable of performing nearly any sensing and data analysis task. The smart sensor device can fuse data streams from a variety of sources (sensors) and then locally determine the current state of the environment in which the smart sensor is placed. The resultant data, rather than raw data, is communicated to the outside world when the microsensor device is queried.

Referring now to FIG. 1, there is shown a block diagram of a smart sensor module 10 in accordance with one embodiment of the present invention. The smart sensor module 10 includes an array of sensors 20 for sensing characteristics of the environment in which the smart sensor 10 is placed. Alternatively or in addition to a sensor array, physical connectors for sensor leads may be provided. The sensing elements included in array 20 can respond to a variety of external environmental stimuli in the form of physical parameters, chemical parameters or biological parameters. Physical sensors can include those that respond to temperature, pressure, shock, vibration, electric fields, magnetic fields, optical irradiation, particle radiation, thermal radiation, momentum, acceleration, flow, viscosity, density, mass, shear strain, conductivity, impedance, sound, ultrasound, etc. Chemical sensors can include those that respond to specific organic or inorganic chemical elements or compounds or complexes in liquid gas or solid phases. Biological sensors may include those sensors that respond to biologic compounds such as proteins, enzymes, antigens, antibodies and other DNA fragments, genes or oligonucleotides. The foregoing lists are not meant to be limiting, as other sensors may be used as desired. The sensors may be either highly specific to the stimuli of interest or broad band, having non-uniform sensitivities to a broad range of external stimulus.

Additionally, in one embodiment of the present invention, the sensors are fabricated on a single substrate and appropriately doped, coated and/or grouped with other sensors to yield the desired response. If desired, the sensors may be integrated as a hybrid system onto a single carrier which functions as a single unit. Additionally, physical connectors for sensor leads may be provided on the sensor layer.

The sensor inputs are conditioned by the signal conditioning stage 25 and provided to the sensor fusion stage 30, which combines the data from multiple types of sensors. From the sensor fusion stage 30, the conditioned sensor provides the sensor data to the general purpose intelligent processing stage 40, which processes the conditioned sensor data in accordance with software within processor 42. The software for each particular application of the smart sensor module can be tailored to the specific environment and application in which the sensor has been placed.

A communications (Comm.) link 50 provides processed sensor data in the form of actionable information to a remote site. Additionally, raw sensor data can be forwarded to the remote site, if desired. For example, if audio is provided at the smart sensor, that raw audio input can be provided directly to a remote site, if desired.

Further, a power supply 60 provides power to all of the different sensor module components. In the most preferred embodiment, at least the power source 60, the general purpose intelligent processor 40 and the communications link 50 are provided in a single compact package. The sensor array 20 may be part of the monolithic smart sensor module 10 and/or may be separately chosen and fixed to the module 10, as will be described herebelow. The wireless communications capability of the present inventions, along with the data fusion and intelligent on-board analysis provides the end user station with processed, actionable data. As will be described below in connection with the examples, the flexibility of the modular design allows the user to interchange different sensor suites with associated control electronics and different communications boards as needed.

Figure 2:
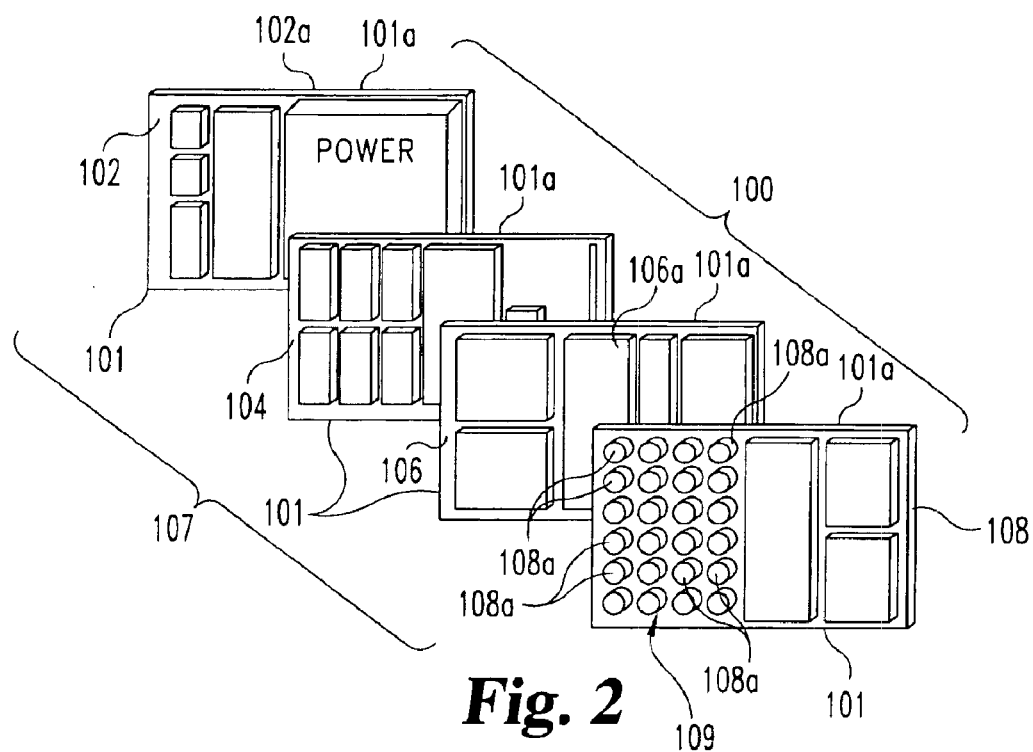
FIG. 2 shows one particular embodiment of the discrete layers used to fabricate the smart sensor module of the present inventions.

Referring now to FIG. 2, there is shown one particular embodiment of a smart sensor module 100 of the present inventions, that includes layers each generally designated by reference numeral 101. Layers 101 are each formed with a corresponding substrate or carrier 101*a*. The smart sensor module 100 of the present embodiment is preferably integrated into a single unit to which any specialized sensor array layer can be added or interchanged. In the present embodiment, the structure of the module 100 is preferably a foundational architecture that allows biological, chemical and/or physical sensor arrays to be read, processed and handled using common electronics and processing layers 101. Accordingly, for the embodiment of module 100 shown in FIG. 2, layers 101 are alternatively, and more specifically, designated by reference numerals 102, 104, 106, and 108, as follows. Sensor module 100 of the present embodiment includes the power layer 102, the communication layer/networking processor 104, the intelligence and processor control layer 106 and the sensor layer 108 with different features 109, such as sources, detectors, actuators. In one embodiment, layers 102, 104, 106 can be collectively used as a sensor subassembly 107 with which different types of sensor layers 108 can be exchanged. In the present embodiment, the hardware of the four layers of FIG. 2 can be identical for all sensor module applications, but can be differently programmed by different software for such applications. Some applications additionally include a passive layer that is application specific. The passive layer interfaces with the sensor array layer 108. For such embodiments, layers 102, 104, 106, and 108 can provide a common subassembly relative to different interchangeable passive layers.

The power layer 102 includes a power source 102*a*, preferably a device that can extract power from the operating environment and convert the energy to a useful electrical form to operate the other elements in the systems. The power may be derived from forms of energy or potential energy, such as solar conversion, acceleration, pressure, temperature, radiation, RF waves, chemicals, piezo-electric or other means. An energy storage device such as a battery, flywheel or other means may be included with or as the primary power source.

The communications layer 104, is preferably, but not limited to, a wireless communication source based on high frequency radio, ultrasonic or optical modulation. Communication may be self-activated or it may respond to an RF tag or a small high frequency transceiver. The communication layer 104 can be on the same substrate or carrier 101*a* as the other components of the system. The communication protocol will allow for asynchronous or synchronous communication with other similarly configured smart sensors and with centralized base stations. In one preferred embodiment, the communications layer 104 adheres to the BLUETOOTH standard. Additionally the communications layer 104 includes the network protocol information.

The intelligence and processor control layer 106 includes a low power processing unit 106*a* capable of cognitive and inferential thinking based on statistics and neural networks for processing. The processing unit 106*a* intelligently assimilates, integrates, and processes the data gathered by the sensors, to yield a useful actionable output. The intelligence layer 106 with its associated artificial intelligence allows the smart sensor module to "sift" information from the raw data being detected by the sensor layer 108.

The processor 106*a* may be in the form of a neural network, a parallel processor or a serial processor. It may include adaptive learning algorithms, such as self-organization feature map (SOFM), adaptive resonance theory (ART), feed forward (FF) neural network, recurrent neural network (RNN) and/or Hopfield and bi-directional associative memory (BAM) learning techniques. Additionally or alternatively, rule-based systems (decision trees, expert systems, fuzzy sets, fuzzy logic, dynamic programming, etc.) and classical data gathering and processing techniques may be used.

The processor 106*a* and/or intelligence layer 106 may process the data or actions from other smart sensors. Further, the processor 106*a* may compare data to historical data or trends to determine an action based on that historical data or trends and may infer the presence of additional data or trends from other smart sensors or from other sensors in the smart sensor array. Additionally, the smart sensor can utilize readings from the other smart sensors to essentially create a "virtual" sensor that can provide a value that can be utilized in place of the missing data. Using its built-in intelligence, the smart sensor can call on other smart sensors to assist in sensing an unknown or weak signal object.

The intelligence layer 106, working with the communications layer 104, is capable of supporting networked communication with other smart sensors to relay information, infer the presence of missing data, yield actionable results based on collective weighted inputs from the other smart sensors as a distributed neural network. The multisensor data may be integrated and reduced to situation summaries and action parameters. If desired the processor layer 106 can contain flash memory for ease of programming and for removable data storage.

The intelligence 106 layer may be programmed to operate the smart sensor in a variety of operating modes. The intelligence layer 106 can cause the smart sensor module 100 to enter a sleep mode in order to save power. The smart sensor module 100 may then "wake-up" when the communication layer 104 receives a ping or wake-up request. Additionally, the intelligence layer 106 may be programmed to operate in a mode where the smart sensor module 100 periodically automatically wakes-up and processes data. In another mode, the smart sensor module 100 can operate continuously. The intelligence layer 106 may additionally cause the smart sensor module 100 to operate in an identification/status mode. In such a mode, the smart sensor module 100 processes and reports data when queried.

The sensor array layer 108 can include a few or many thousands of individual sensing elements 108*a* (only some of which we specifically designated by reference numerals), permitting multiple parameter measurements in a single unit. Each sensor element 108*a* or groups of elements 108*a* can be activated and integrated into the intelligence process. Accordingly, in one form, economies of scale for manufacturing more sensors than needed for a particular task can be utilized to make the smart sensor layer 108 versatile enough to be used on many different applications. As such, the sensor array layer 108 includes the versatility necessary to be reconfigurable for sensing biological, chemical and physical parameters. Thus, many sensor applications can be constructed from a single smart sensor layer 108 via fusible links, firmware and/or on-board software, and the applications customized at the time of implementation. Alternatively, smart sensors may be customized through selective layering techniques at the time of fabrication.

Among other things, the sensor array layer 108 may include optical sources (lasers, LEDs, etc.), optical detectors, ultrasonic transducers, physical connectors and the interface to perform magnetic activation. Additionally, the sensor array layer 108 may include appropriate conditioning electronics for the sensors to convert outputs into compatible voltages, currents, frequencies, phases or actions that can be organized, compared, validated, calibrated, serialized, and analyzed. Alternatively or additionally, sensor layer 108 can include one or more other sources, detectors, actuators, output devices, and/or input devices.

Figure 3:
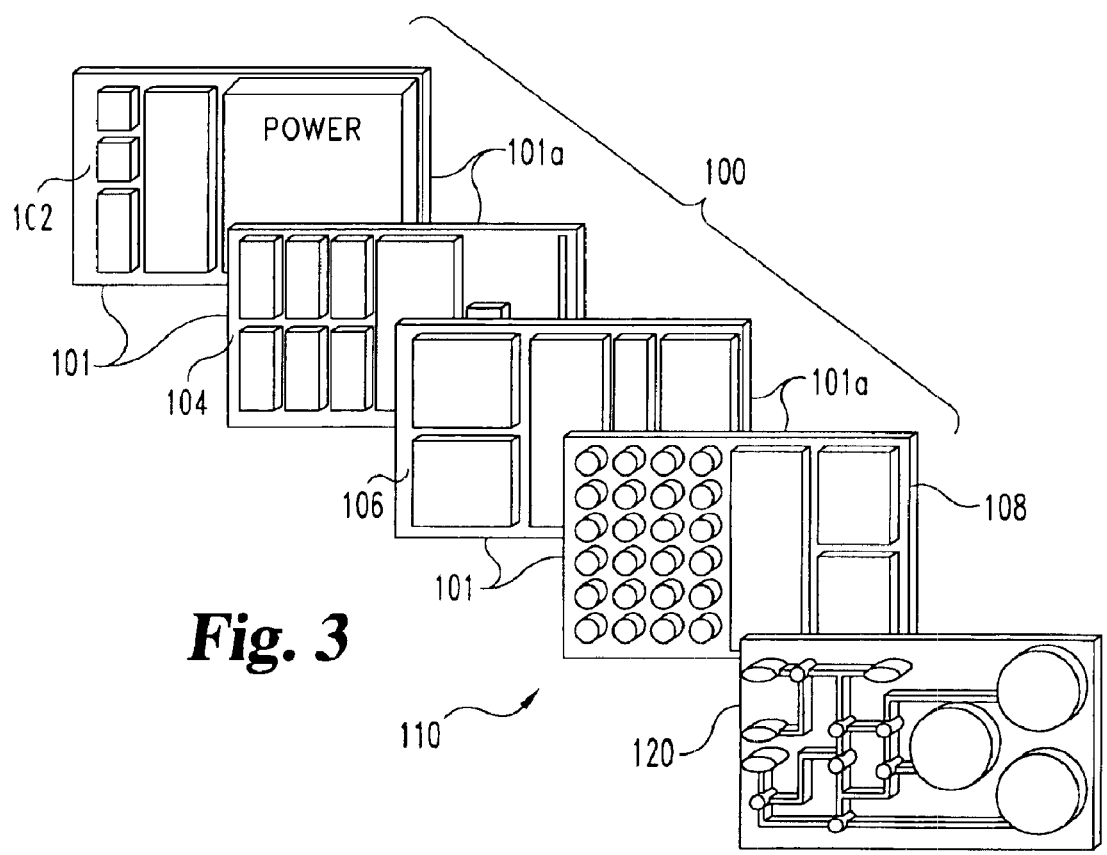
FIG. 3 shows the basic smart sensor module interfacing with an application specific passive layer.

FIG. 3 shows sensing module 110 with the basic smart sensor module 100 of FIG. 2 interfaced with an application specific passive layer 120, including features 121. The chemical and biological processing is done on the passive layer 120, which is preferably disposable. The passive layers can include physical connectors, micromolded sensors and/or a moldable microfluidics array. If desired, the micromolded passive layers can be designed so that it does not include wires. For physical measurements, the active components of the sensing transducers (e.g. interdigitating leads for strain or pressure, etc.) may be adhered in the passive layer to a structure or container being measured. The addition of the passive layer 120 and internal software adapts the general purpose smart sensor module 100 for particular applications. The passive layer 120 is designed to be slide into or attach to the sensing layer 108 and have no electrical connections between it and the sensing layer 108. As such, the sensing layer 108 is designed to sense the condition or contents of the fluidics or transduction devices on the passive layer 120 via non-contact means. The use of a swappable passive layer 120 permits the smart sensor to be modularized and allows for very rapid interchange of application specific passive layers 120.

Figure 5:
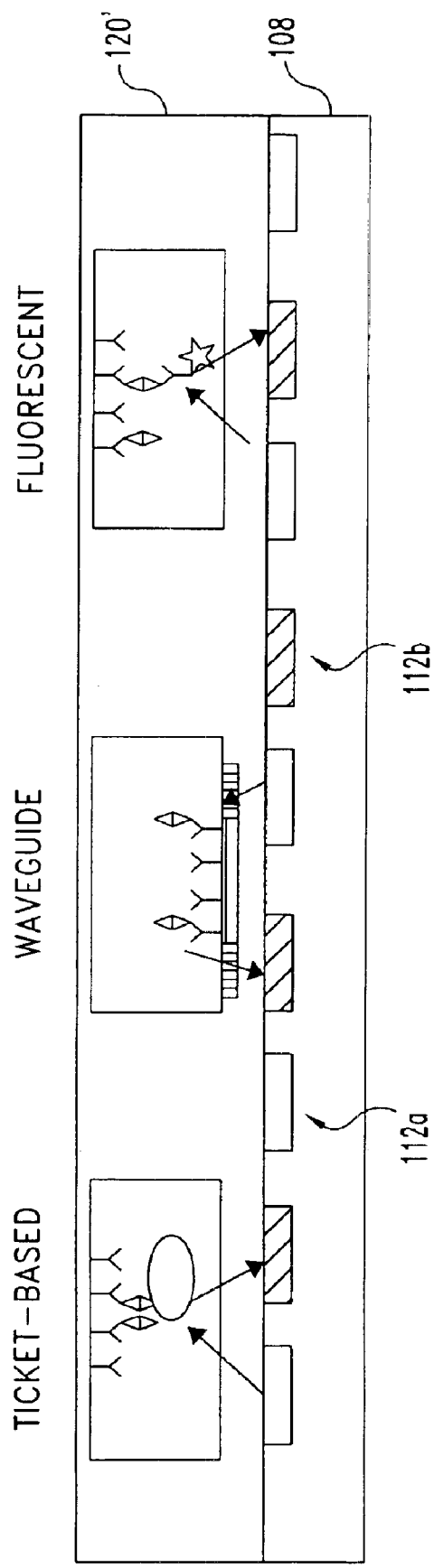
FIGS. 5–7 show an example of an optically implemented biosensor using the general purpose smart sensor module and a passive layer.
Figure 6:
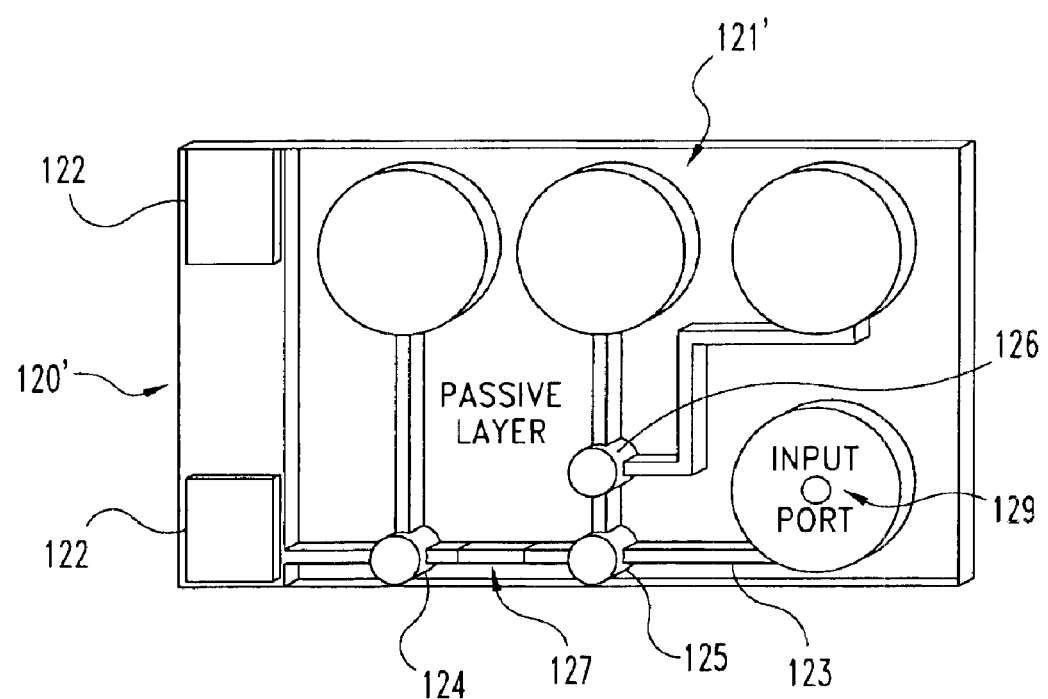
Figure 7:
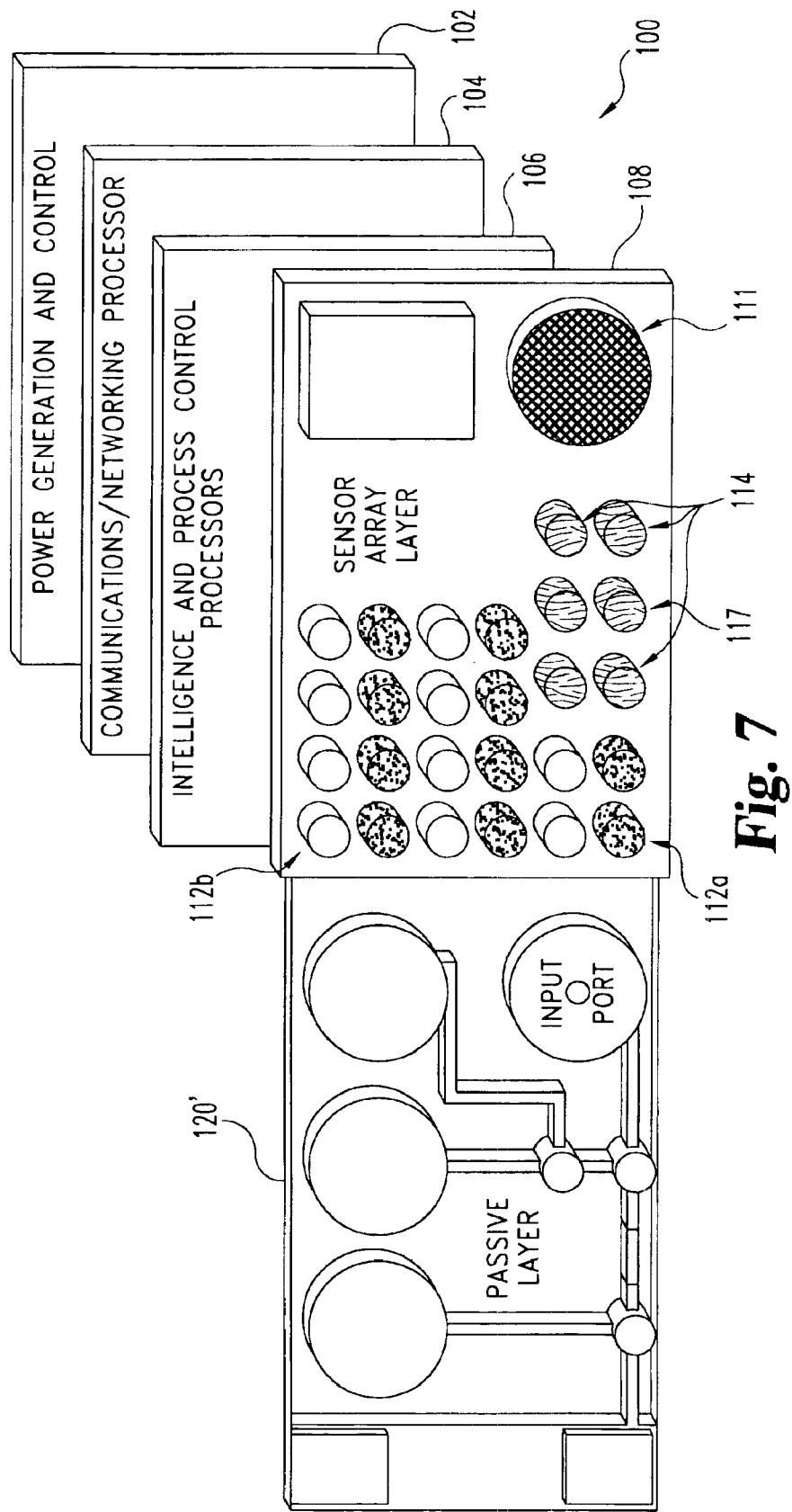

Referring now to FIGS. 5–7, there is shown an example of an optically implemented biosensor using the general purpose smart sensor module 100 and a passive layer 120' in communication with the sensor array layer 108. FIG. 5 shows a schematic cross section of the microfluidics channels and optically implemented biosensors of the passive layer 120'. As shown, there are a variety of ways to sense antigen/antibody interactions or DNA using optical sources 112*a* and detectors 112*b*. The passive layer 120' of FIGS. 5–7 includes features 121' such as optical waveguide biosensors 122, microfluidics channels 123, magnetic controlled valves 124, 125 and 126, magnetic foam 127 for BEADS and an input port 129. The passive layer 120' sits over the sensor array layer 108 of the smart sensor module 100. As can be from FIG. 7, sensor module control of the ultrasonic agitator 111, optical source 112*a* and detector 112*b*, magnetic control valves 114 and BEAD control 117, directly result in application specific functions resulting in the passive layer 120'.

Figure 8:
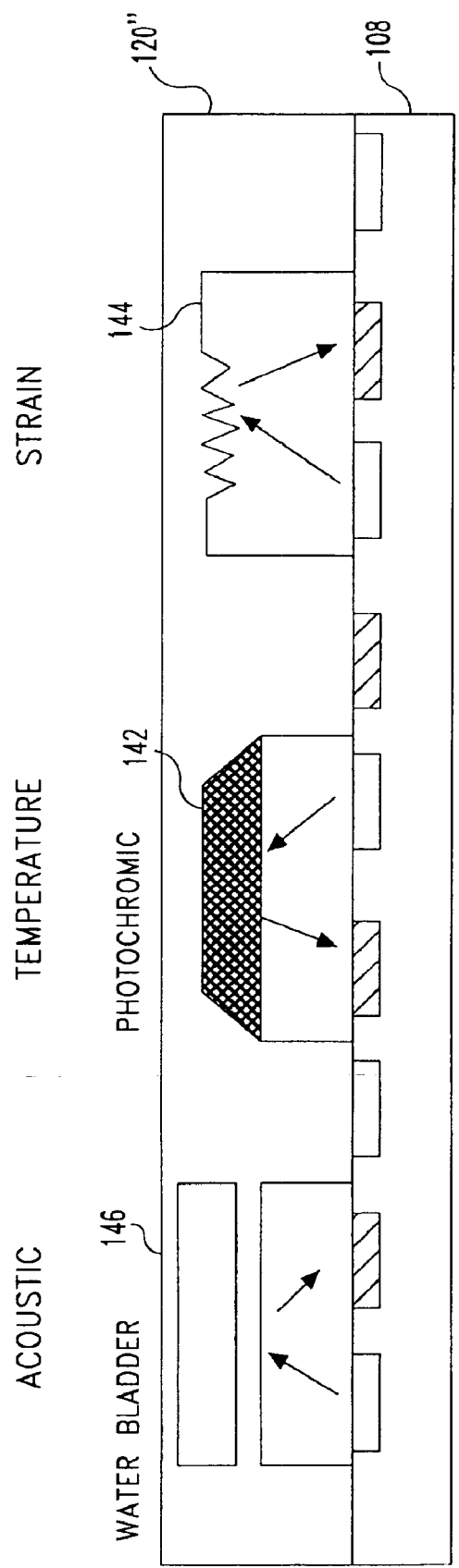
FIGS. 8 and 9 show an optically implemented physical sensor in accordance with one embodiment of the present inventions.
Figure 9:
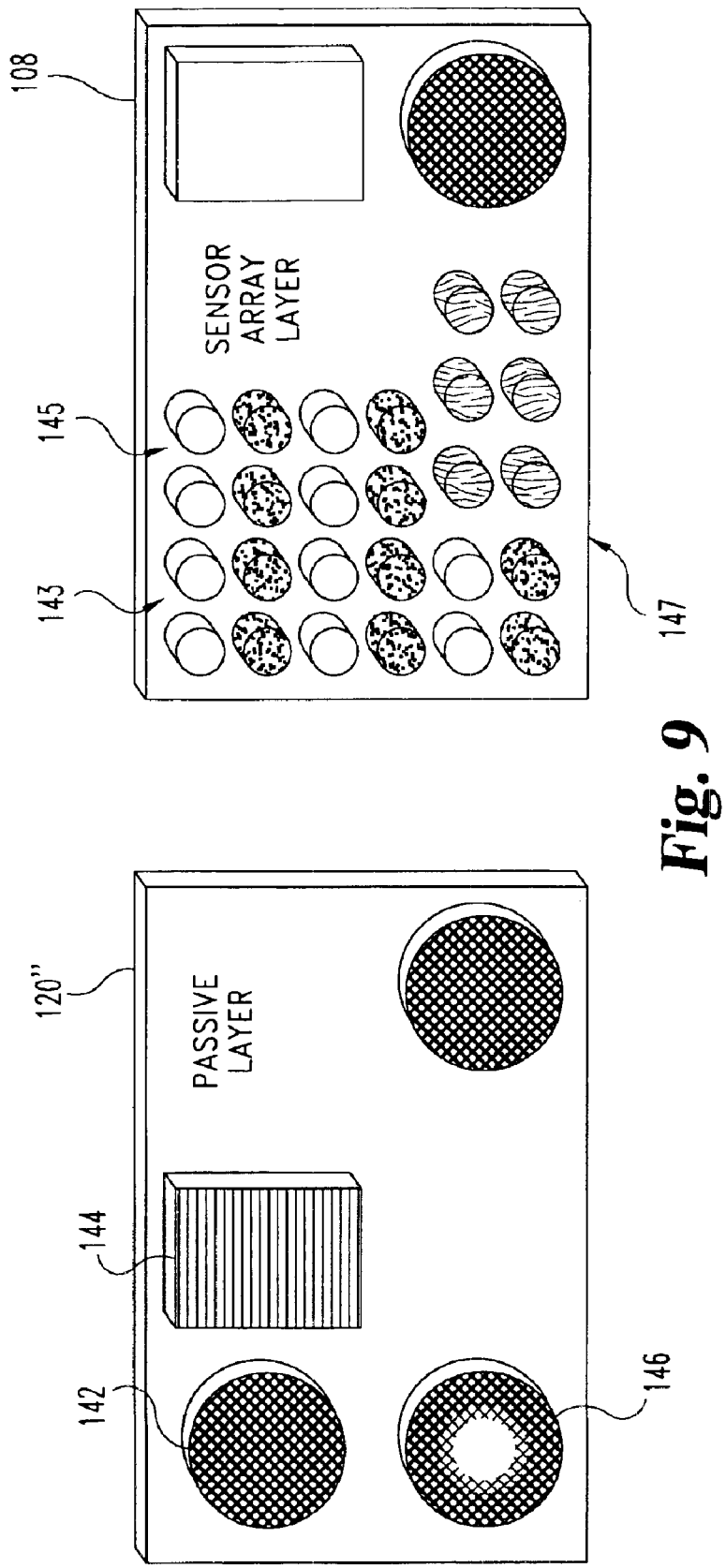

Similarly, referring to FIGS. 8 and 9, there is shown an optically implemented physical passive layer 120". There are a variety of ways to sense physical attributes (temperature, acoustic, strain, etc.) using optical sources and detectors. Using the same general purpose smart sensor module as described above in connection with FIGS. 5–7, different software and a different passive layer, physical characteristics of the sensor modules environment can be detected. For example, although the same sensor array layer 108 is used to interface with the physical passive layer 120" as with the biosensor passive layer 120' of FIGS. 5–7, different elements of the sensor array 108 can be selected by the application specific software to actuate the appropriate optical source and detectors. As shown in FIG. 9, the temperature sensor 142 interacts with temperature source/detector 143. Strain sensor 144 interacts with the optical source/detector for strain 145. Similarly, the acoustic sensor 146 interacts with the source/detector 147 for the acoustic sensor. As noted above, the physical sensor software selects the appropriate optical sources and detectors, which may be different from the sources and detectors selected by the biosensor software. Note that the sensor layer 108 is configured identically with that of the biosensor application of FIGS. 5–7.

Figure 4:
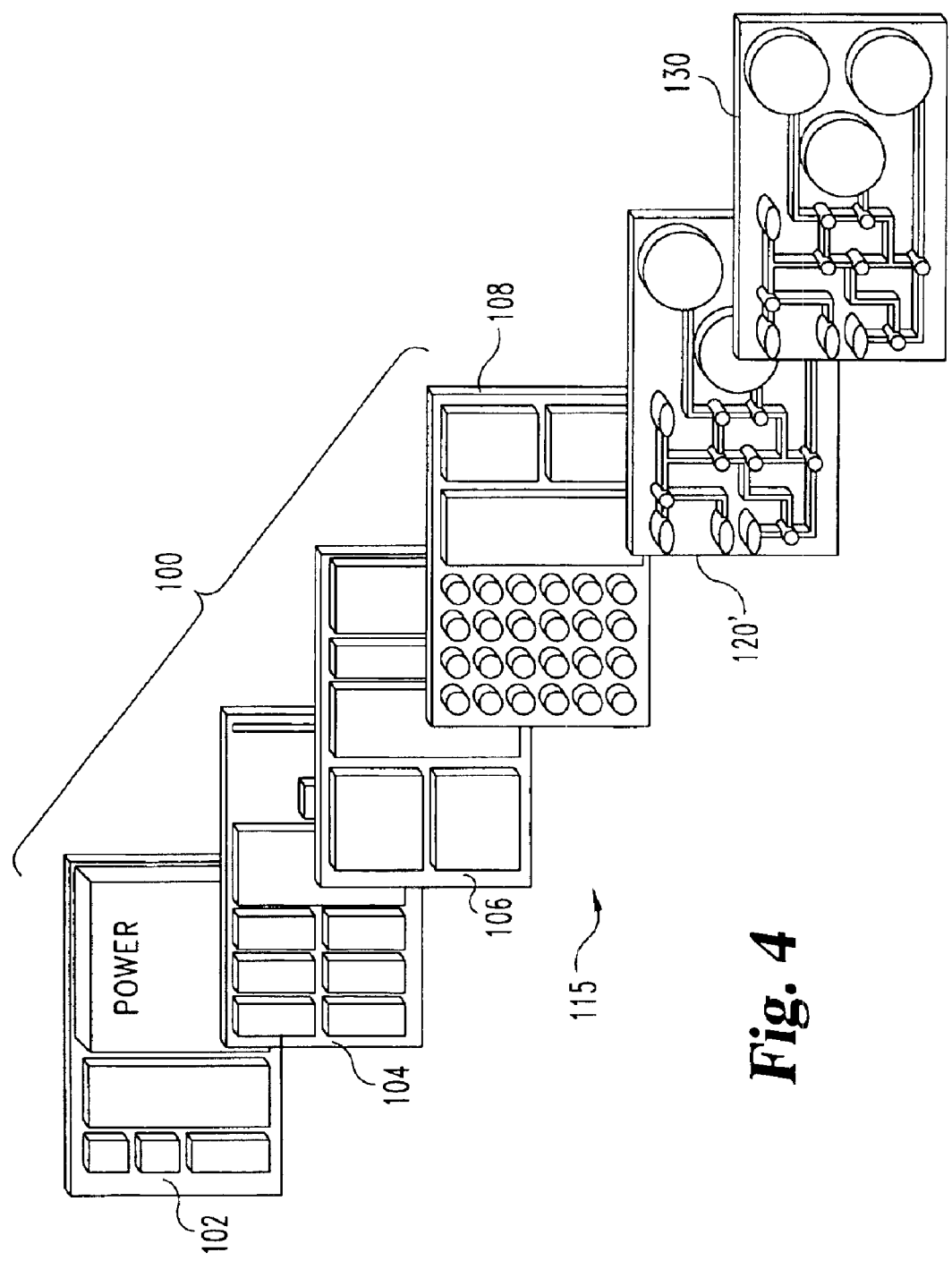
FIG. 4 shows a smart sensor architecture including an additional process control layer disposed in contact with the passive layer.
Figure 10:
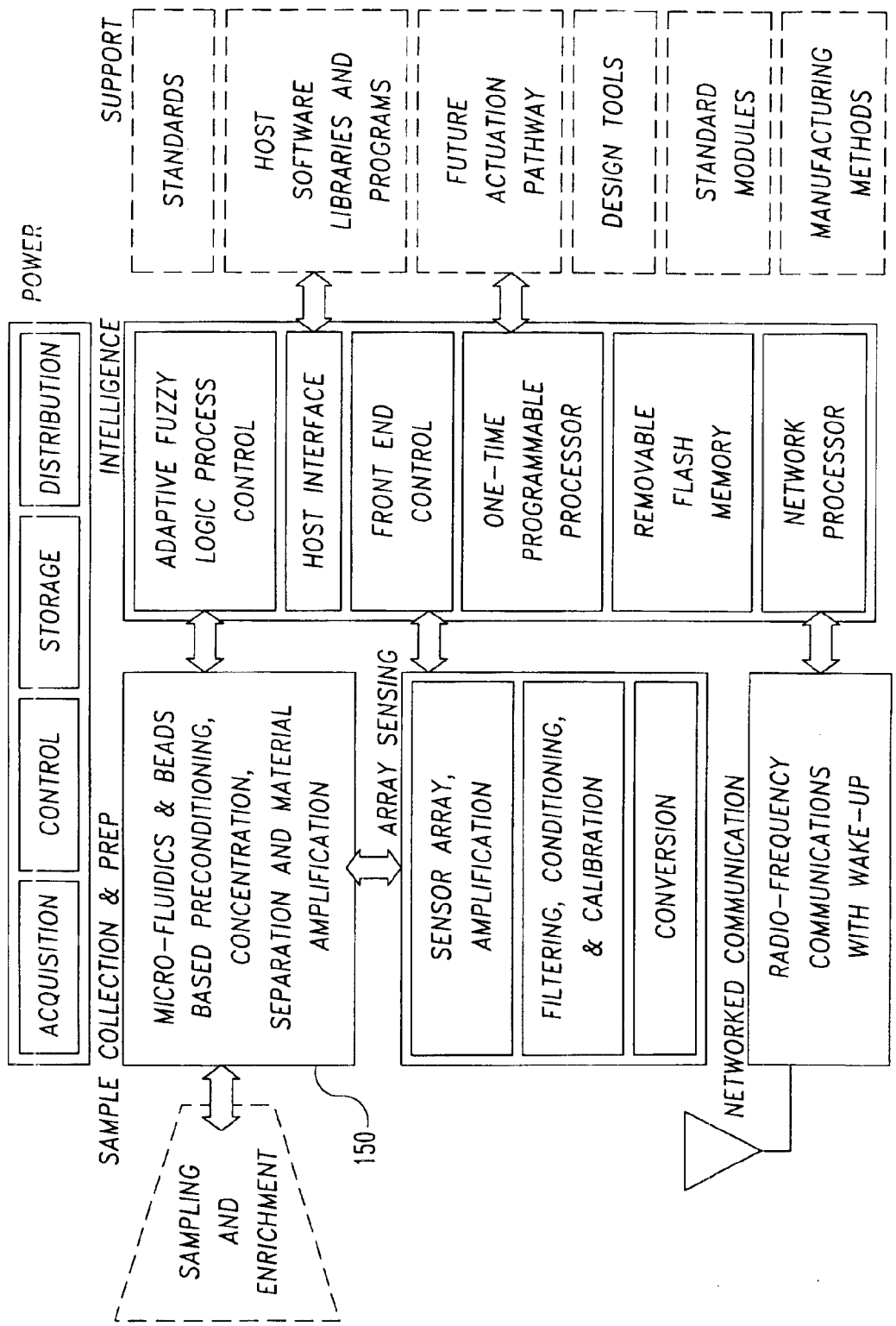
FIG. 10 shows a more detailed block diagram of one particular embodiment of the general smart sensor system architecture for a general purpose smart sensor, such as the smart sensor of FIG. 1 or of FIGS. 2–4.

Referring now to FIG. 10, there is shown a more detailed block diagram of one particular embodiment of the general smart sensor system architecture for a general purpose smart sensor, such as smart sensor 10 of FIG. 1 or 100 of FIGS. 2–4. Note that the particular embodiment of FIG. 10 uses adaptive fuzzy logic as the process control component of the system. Additionally, the sample collection and preparation stage 150 is a passive layer, such as passive layer 120, 120', or 120".

Figure 11:
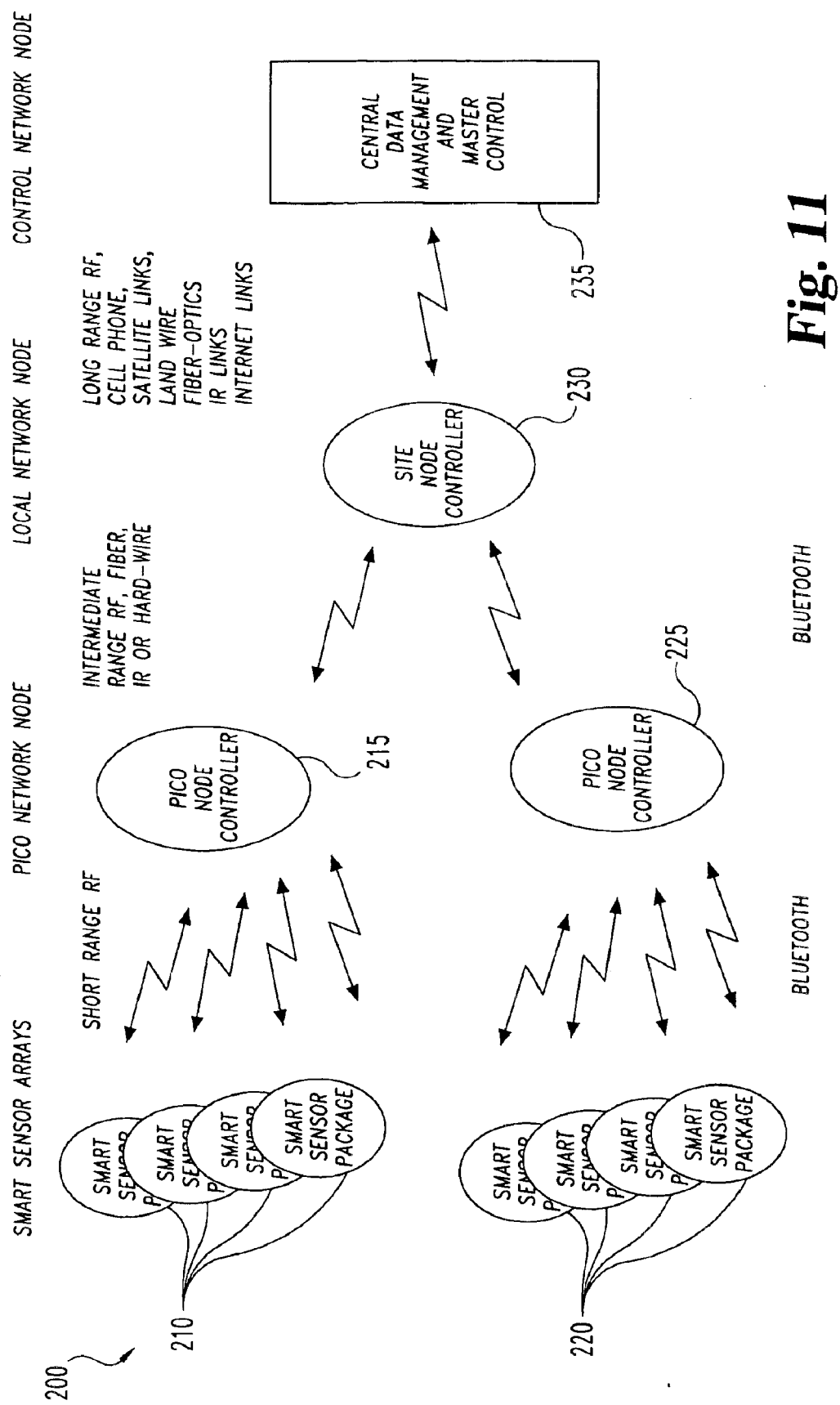
FIG. 11 shows a diagram of one particular embodiment of the communication system between a plurality of smart sensor modules and a remotely located central data management and master control node or station.

Referring now to FIG. 11, there is shown a diagram of one particular embodiment of the communication system 200 between a plurality of smart sensor modules 210, and a remotely located central data management and master control node or station 235. Sensor module 210 can be comprised of modules 10, 100, a combination of these, or of a different type as would occur to those skilled in the art. As shown, the smart sensor modules 210 located in the system 200 may communicate locally with pico-node controller 215 through either active or interrogated RF communications. Pico-mode controller 215 can be of a dedicated type or comprised of one or more of smart sensors 210. In the example of FIG. 11 a pico-network of smart sensor modules 210 use short range RF interrogation to communicate the processed and/or raw data to the pico-node controller 215. In that same example, a pico-network of smart sensor modules 220 communicates the processed data and/or the raw data to the pico-node controller 225 using the frequency hopping technique characteristic of the BLUETOOTH standard. However, in actuality, one or both of the shown communication techniques may be used, or a different communication technique may be used, if desired. The pico-node controllers 215, 225 transmit the information to the site node controller 230 via any of BLUETOOTH, the IEEE 802.11b standard, intermediate range RF, fiber, IR or a hardwired communications network, to name just a few. The site node controller 230 may communicate with the central network node 235 using long range RF, cell phone, satellite links, land lines, fiber-optics, IR links, internet links, LAN, WAN, or other means of communication. Note that using the BLUETOOTH standard, the smart sensor modules can be addressed and address each other through the pico-node controller 225 and/or site node controller 230.

Referring now to FIG. 4, there is shown a smart sensor module system 115 architecture including an additional process control layer 130 disposed in contact with the passive layer 120. The process control layer 130 may be utilized in connection with the chemical and biological detection schemes that use microfluidics to process the samples. As such chemical and biological detection techniques that require fluid transfer, manipulation of concentration, and/or enhanced specificity of detection can be implemented. The process control layer 130 couples with and controls the micro-fluidics layer via non-contact actuation (i.e. electrostatics, magnetics, optics, etc.) controlled preferably by a dedicated processor using fuzzy logic, neural control, algorithms or classical control methods.

Figure 12:
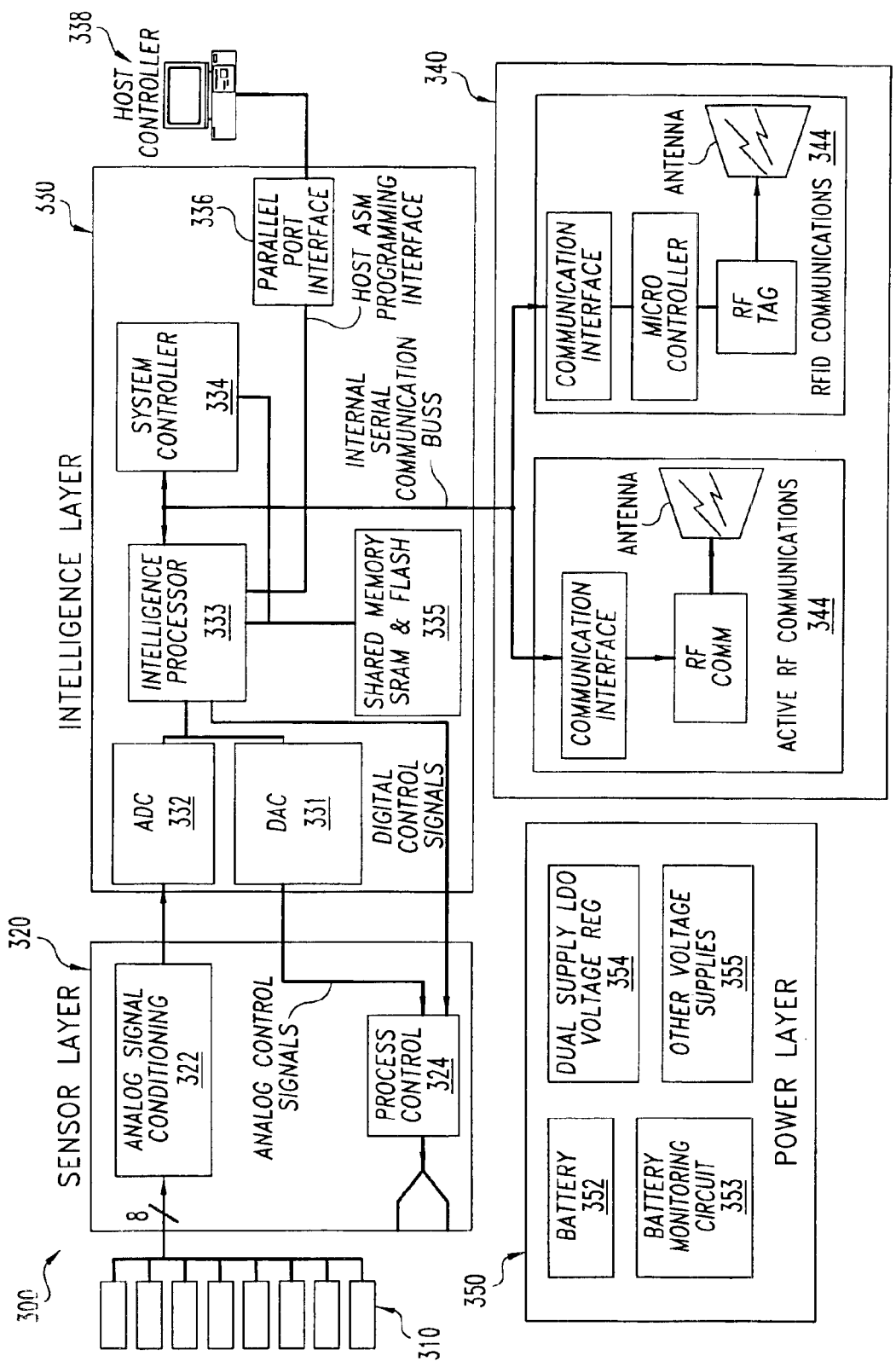
FIG. 12 is a block diagram showing one specific hardware implementation of a general smart sensor in accordance with one embodiment of the present inventions.

FIG. 12 is a block diagram showing one specific hardware implementation of a layered sensor device 300 in accordance with one embodiment of the present inventions. The sensor device 300 includes a plurality of sensor inputs 310, which may be a physical connector. In the present embodiment, eight inputs are provided. The sensor array layer 320 includes analog signal conditioning 322 for the eight sensor inputs. Additionally the sensor array layer 320 includes the process control processor 324, which is controlled by a four bit analog control signal from the intelligence layer 330. This process control processor 324 is used to control elements in the passive layer, such as the magnetic valves of the example of FIGS. 5–7.

The intelligence layer 330 includes a data conversion stage having a digital-to-analog converter (DAC) 331 and an analog-to-digital converter (ADC) 332. The eight analog conditioned signals are sampled by the ADC 332. The data conversion stage may be implemented using integrated circuits such as the TLV1570 and TLV5604, both made by TEXAS INSTRUMENTS.

The intelligence layer 330 additionally includes a processor 333 to process the incoming data. In one particular embodiment, the processor 333 is chosen to be a 16 bit fixed point digital signal processor, such as the TMSC320VC5510 made by TEXAS INSTRUMENTS. Intelligence layer 330 additionally includes a system controller 334 for event coordination. The system controller 334 of the present embodiment may be chosen to be a 16 bit RISC-type processor, such as the MSP430 microcontroller, made by TEXAS INSTRUMENTS. The processor 333 and system controller 334 may share a memory 335 for program and data storage. In one particular example, a stacked CSP 3V memory made by INTEL is used. Alternatively, each unit may be provided with its own memory.

A parallel port interface 336 is provided as a programming interface for downloading application specific software to the sensor device 300 from a host computer 338. Alternatively, application specific software may be transmitted to the smart sensor from a central station wirelessly, such as, by using BLUETOOTH, 802.11b protocol or other protocols. In this way, smart sensors can be reprogrammed for different applications and/or functions very rapidly in the field.

Further, an internal modular serial communication bus is used to connect the intelligence layer 330 to the communications layer 340. A high speed programmable gain amplifier, such as the PGA202 made by BURR BROWN, may additionally be included.

In the particular embodiment of the present inventions, two different types of RF communication (active and passive) are shown. This is not meant to be limiting, as the inventions can be made with any one or more of the disclosed communication systems, or with another system, such as infrared (IR), if desired. Communication layer 340 of FIG. 12 includes an active RF communications system 344 which, in the present embodiment, is made in accordance with the BLUETOOTH frequency hopping protocol. A passive RFID interrogated tag system 346 is additionally provided.

A power layer 350 is provided. In the present embodiment, a battery 352 is provided as the primary power source. The battery 350 may be a 5–9V lithium or alkaline battery. A battery monitoring circuit 353 provides an alert when the charge level of battery 350 is low. Additionally the battery monitoring circuit 353 monitors the capacity of battery 350 of battery 350 remaining in the power supply. An LDO voltage regulator 354 is additionally provided. The LDO voltage regulator 354 may be a DSP dual supply. If desired, other voltage supplies 355 (such as parasitic voltage supplies or others described above) may be provided in the power module 350. In one embodiment, layers 320, 330, 340, and 350 are stacked one on top of the other to provide an integrated form of sensor device 300.

The smart sensor modules of the present inventions can be used for a number of applications. For example, smart sensor modules as described herein may be particularly useful as pump diagnosticians, health monitors, smart heating/cooling systems, water-pump optimizers, smart tags and in smart automotive applications. The following examples will be used to demonstrate the versatility of and possible applications for the general smart sensor modules described herein.

EXAMPLE 1
Pump Diagnostician

A smart sensor employed in a pump environment may be set up to detect various characteristics of the pump system. For example, the passive layer (120 of FIG. 3) may include physical sensors to measure pressure suction/discharge, flow, temperature, sound, voltage/current, and/or vibration. Using the inputs from these sensors, the smart sensor module processor may detect and record anomalies, estimate faults and suggest maintenance schedules. Summaries and processor suggestions may be wirelessly transmitted continuously or periodically to a remote station. As such, processed actionable data derived from the raw data from different sensors is sent to the remote station, instead of the raw data that would need to be processed remotely. Additionally, the smart sensor can determine actions to take, for example, to reduce vibration, and implement them locally without outside interaction if programmed to do so. This embodiment permits the smart sensor to operate autonomously, semi-autonomously, or in a slave mode dependent upon user requirements.

EXAMPLE 2
Health Monitor

A smart sensor employed as a health monitor may include a passive layer having physical sensors that detect pulse (audio, PPG or ECG sensors), breath (audio sensor), respiration (piezoelectric), temperature, blood oxygen (PPG), omega waves (long wavelength electrical signals that indicate stress), EEG signals and/or sweat index (moisture sensor). The smart sensor module can process data from the health monitor sensors to detect and record anomalies, calculate daily statistics for the patient, calculate total calories, etc. Such a smart sensor module could be a standalone module, or could be incorporated into a smart bandage or smart belt scanner worn by the patient, a hand held health monitor scanner, a smart sensor glove or sock or a smart mattress in contact with the patient.

For example, rather than serving as a wound dressing, a smart bandage may include one or more sensors or measuring devices to detect the presence of biological fluids, biological agents, genetic material, radiation, color "tags" for a given material or analyte, medication, oxygen, blood gases, red or white blood cells, temperature, pulse, sound, light or indicia of infection. In addition, the detector may comprise an imaging device capable of imaging at least a portion of the surface below the smart bandage. The sensors may be present in the smart bandage in any practical combination thereof. Additionally the smart bandage may further include a component for applying or releasing substances that aid in fighting infection, reducing scarring or accelerating healing.

The hand-held medical scanner and belt scanner can additionally include ultrasound techniques and other sensors as described in connection with the smart bandage. The smart sensor module may send information to a computer for display of the wound or ultrasound image on a monitor or television. Additionally, the smart sensor module could send the information to a personal goggle device, where the information may be displayed in image or textual form at eye level to the user.

Figure 13:
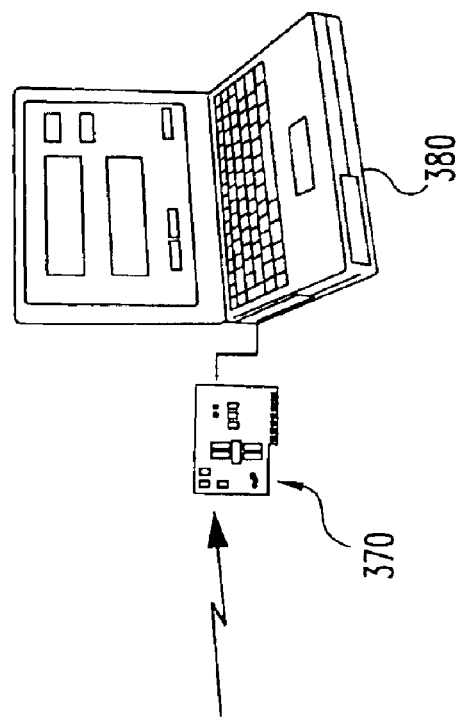
FIG. 13 shows an example of a portable device incorporating a smart sensor module in accordance with one embodiment of the present inventions which is useful as a portable health monitor.
Figure 13:
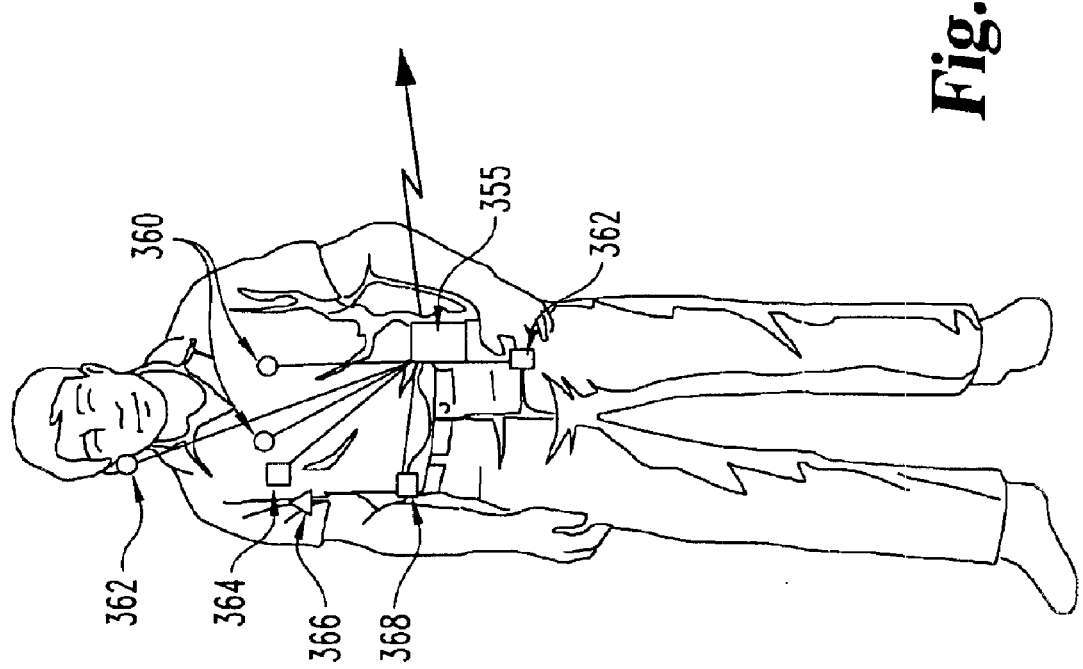

Referring now to FIG. 13, there is shown one particular example of a stand-alone smart sensor module 355 including physical connectors in its sensor array layer to receive the inputs from multiple sensors connected thereto. Sensors 360 include ECG sensors connected to the smart sensor module 355. Other sensors 362 are PPG sensors. In the present example, sensors 364 and 366 can be used to detect respiration and temperature, respectively. Additionally, sensor 368 may be an accelerometer. As shown in FIG. 13, in the present example, the sensors 360, 362, 364, 366 and 368 are physically connected to the sensor layer of the smart sensor module 355 by electrode leads connected to physical connectors on the sensor array layer (108 of FIG. 2) of the smart sensor module 355. Alternatively, some or all of the sensors 360, 362, 364, 366 and/or 368 could be fabricated as part of the sensor array layer, or affixed as hybrid components to the sensor array layer, or if using a reconfigurable, general purpose smart sensor module can be affixed to or fabricated as part of a passive layer (120 of FIG. 3) in communication with the general sensor array layer. The smart sensor module 355 intelligently combines the data from the multiple types of sensors and analyzes the data. The processor of the smart sensor module 355 can report processed data summaries wirelessly to a host PC or caretaker via a communications link card 370. This reporting can occur when the intelligent processor of the smart sensor module 355 determines by rule based analysis that the patient's vital signs indicate the patient is in crisis, or can report back when polled by the monitoring station 380, or can be programmed to periodically transfer vital statistic summary reports and/or raw data to the monitoring station 380.

EXAMPLE 3
Smart Heating/Cooling System

A smart sensor module employed in a smart heating or cooling system could include a passive layer to detect temperature in/out, humidity, voltage/current draw. The smart sensor module can use this information to automatically adjust the system to maximize comfort through rules learned over time based on behavior or predetermined characteristics. Additionally, the smart sensor module can automatically adjust the system to minimize energy usage and can suggest maintenance schedules.

EXAMPLE 4
Waterpump Optimization

A smart sensor module employed in a waterpump optimization system could include a passive layer for measuring pressure suction/discharge, flow and temperature. Using the sensed information along with the weather forecast data, the smart sensor may automatically minimize energy usage for different rate structures, alternate pumps to maximize pump lifetime and/or suggest maintenance schedules.

EXAMPLE 5
Smart Tag

A smart sensor module employed as a smart tag could include a passive layer for measuring vibration, temperature and/or humidity. Using the information, the smart sensor may automatically detect and record when unsafe operating conditions occur. The smart sensor module may additionally alert a remote station under certain operating conditions.

EXAMPLE 6
Automotive Applications

A smart sensor module employed in automotive applications could include a passive layer for measuring pressure, biological signs of the driver, and/or image data from a rearview mirror. Using the information, the smart sensor may automatically position the mirrors, monitor fatigue of the driver and possibly provide a wake up alarm, recognize the driver, and/or adjust the seat and/or airbag parameters. Additionally a smart oil sensor module could be provided for automobiles or small construction equipment. The sensor would be in the changeable oil filter and could monitor oil characteristics that provide indications of engine wear. The module could alert the vehicle operator of the need for an oil change. This could be based on detection of threshold level of metal content in the oil and/or oil viscosity that indicates the oil is degrading.

EXAMPLE 7
Poultry Processing

A smart sensor module could be used as a pathogen detector in poultry. The module could measure and process key environmental factors such as temperature, moisture, water quality (chemicals).

EXAMPLE 8
Smart Package

Smart sensor modules incorporated into smart packages can measure the content and character of a package. It can determine when the package is opened and how much content has been removed. It can determine if the character of the content is changed or degraded. It can track the location and storage conditions of the package. Such package parameters can be communicated wirelessly on a routine and/or alert basis. Applications for this smart package would include storage and use of agrochemical products, fuels and volatile products, and the storage of hazardous materials, such as waste, weapons, missiles, etc.

EXAMPLE 9
Smart Med-allion

A smart sensor module could be provided that is worn around the neck, wrist or on a chest band for continuous monitoring of a patient. Sensors included could monitor heart rate, heart rhythm, respiration and/or blood pressure. Data could be collected and periodically downloaded to a physician's office and/or home computer. If measurements become abnormal, as determined by the smart sensor module, the wearer would be alerted and a doctor notified. The doctor would additionally be provided with an immediate download of information. If it became an emergency, the device could be programmed to dial 911 and an embedded GPS receiver would identify the location of the individual. This type of smart sensor module application would be useful for people who have heart conditions, respiratory problems, diabetes or other aliments that require continued monitoring but not hospitalization.

EXAMPLE 10
Smart Sprinkler System

A smart sensor module can be employed in agricultural applications and for home lawns and gardens. The sensor module could sense moisture and crop or plant health. Upon local processing of the detected information, the smart sensor module would automatically apply water, and if needed, add fertilizer and pesticides/fungicides to the application, as needed. Valves controlled by the smart sensor can be used to add liquid fertilizer to a water stream provided by sprinklers.

EXAMPLE 11
Determination of Genetic Traits in the Field

Figure 14:
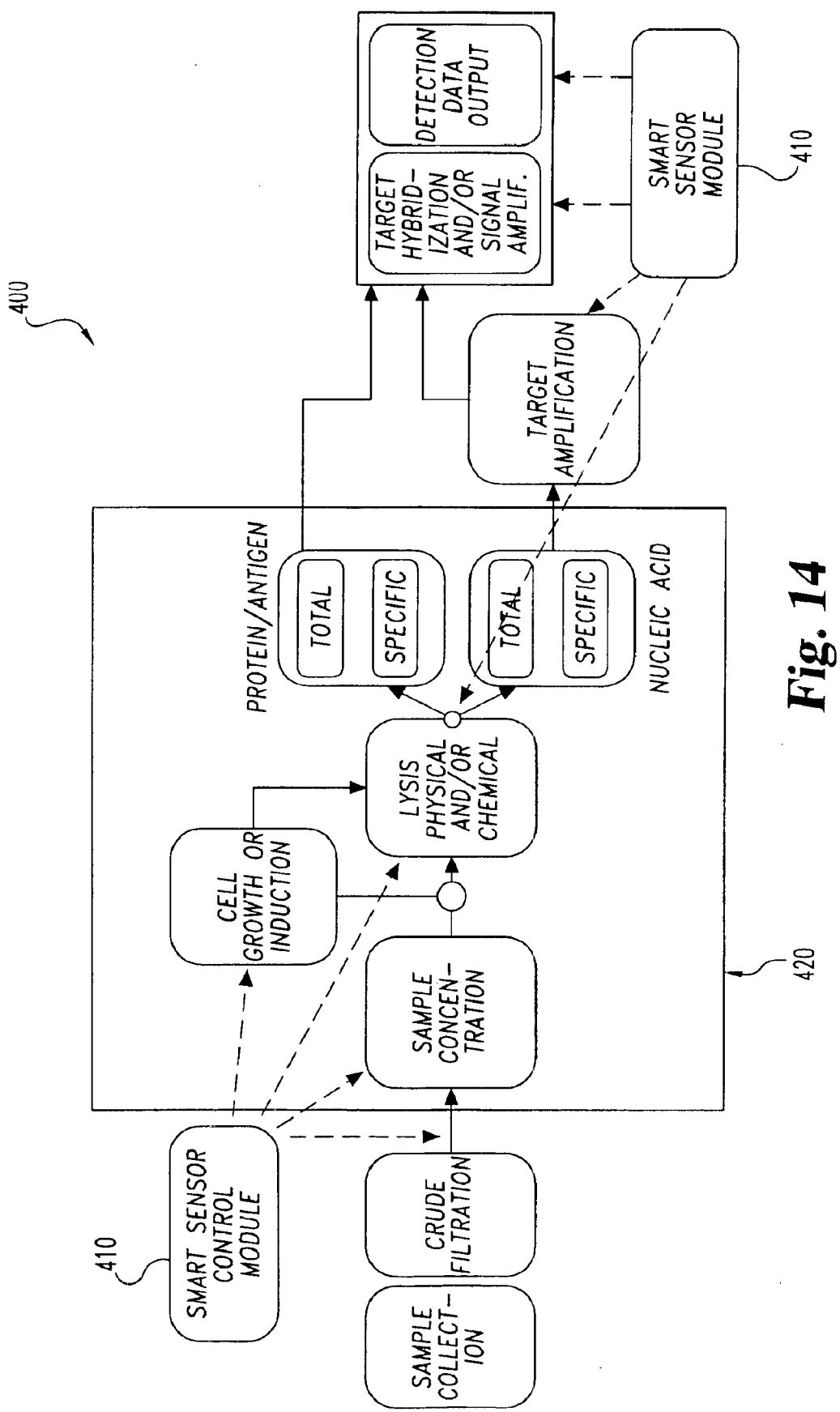
FIG. 14 shows an example of a portable device incorporating a smart sensor module capable of sampling and locally analyzing a biological sample for the detection and identification of multiple genetic traits.

Referring now to FIG. 14, there is shown one example of a portable device incorporating a smart sensor module capable of sampling and locally analyzing a biological sample for the detection and identification of multiple genetic traits. An integrated, automated system for testing genetic traits having a processor that provides automated feedback to the sample preparation or detection components within the integrated device is provided. A plurality of sensors provided on the smart sensor module samples differing analytes (such as protein and nucleic acids) and fuses the data streams into a single information product. This system is particularly useful for analyzing genetic traits of crop samples in the field. The device 400 of FIG. 14 uses the smart sensor module 410 (similar to 100 of FIG. 2) and a biological sensor passive layer 420 to perform multiple analyte detection, data analysis, and to report the information relating to the results. The system has the ability to: (a) process multiple sample types; (b) identify and characterize multiple analytes simultaneously; (c) integrate multiple sensor devices in subsystems; (d) integrate and fuse data streams from multiple sensors into an information product; and (e) communicate data wirelessly. Sensor module 410 including the biosensor passive layer 420 has applicability to a variety of systems, with detection of genetic traits, such as nucleic acid sequences, proteins and chemicals, such as lycopene and Vitamin A, in agricultural products.

Note that all of the above smart sensor module applications can be made using the general smart sensor module described in connection with FIG. 2 by providing application specific software and an application specific sensor array passive layer. Other smart sensor module applications such as smart labels, inventory control and supply systems, condition tracking and alert systems, machine prognostics, smart appliances, smart houses, pulmonary drug delivery monitoring, wellness watch services and critical care alerts can be provided using the general smart sensor module by adapting the software and passive layer sensor suites to the particular application. Other physical and biological smart sensor applications possible with the above inventions include blood pathogen detection, POC medical diagnostics, medical monitoring pill, food pathogen detection, water pathogen detection, veterinary medicine, biological threat detection and/or non-invasive blood chemistry testing. Additional physical/chemical/biological smart sensor applications possible with the above inventions include, drug efficacy monitoring, medical ventilator monitoring, crop health monitor and/or smart patch medical emergency diagnostics. Further, it should be understood for sensor module/device embodiments that are reconfigurable, a corresponding number of different configuration programs can be resident in the module or device with manual and/or automatic selection or "activation" of the appropriate program being provided. Alternatively or additionally, the module can be reprogrammed with each configuration change.

Many further embodiments of the present inventions are envisioned. For example in other embodiments, the layers, sensor types, module types, and the like can be combined or interchanged. In another example, a layer including one or more actuators is provided that is responsive to information processed from one or more sensors. In still another example, a sensor module comprises: a wireless communication device; at least two sensors each operable to sense a different characteristic and provide corresponding sensor signals; a processor operable to provide information determined from the sensor signals in accordance with an adaptive learning routine; and a power source operatively coupled to and carried with the wireless communication device, the sensors, and the processor. For one form of this embodiment, the adaptive learning routine includes an algorithm based on at least one of the group consisting of: a self-organization feature map, adaptive resonance theory, a feed forward neural network, a recurrent neural network, and Hopfield and bi-directional associative memory learning. Alternatively or additionally, the power source, the wireless communication device, and the processor each correspond to one of three different layers coupled together to provide an integrated sensing subassembly; and/or may include one or more interchangeable passive layers.

In yet another example, an apparatus comprises: a sensor module with at least two sensors each operable to sense a different characteristic and provide corresponding sensor signals; a processor operable to provide sensor module location information determined from the sensor signals in accordance with an adaptive learning routine; and a wireless communication device operable to transmit the location information. For one form of this embodiment, the adaptive learning routine includes an algorithm based on at least one of the group consisting of: a self-organization feature map, adaptive resonance theory, a feed forward neural network, a recurrent neural network, and Hopfield and bi-directional associative memory learning. Alternatively or additionally, the power source, the wireless communication device, and the processor each correspond to one of three different layers coupled together to provide an integrated sensing subassembly; and/or may include one or more interchangeable passive layers.

Still another example comprises: performing a first sensing application with a sensing device, the sensing device including a power source, a processor, a wireless communication device, a first layer to perform sensing with two or more sensors each of a different type, and a memory including first application programming corresponding to one or more features of the first layer; interchanging the first layer of the sensing device with a second layer, the second layer including at least one feature different from the one or more features of the first layer, the memory including second application programming corresponding to the at least one feature of the second layer; and performing a second sensing application with the sensing device after the interchange, the second application being different than the first application.

A further example comprises: providing a plurality of sensing device subassemblies each including a power source, a processor, a wireless communication device, and two or more sensors each of a different type; coupling a first outer layer to one of the subassemblies to provide a sensing device for a first application; coupling a second outer layer to another of the subassemblies to provide a sensing device for a second application different than the first application; and executing a first program with the sensing device for the first application and a second program with the sensing device for the second application, the first program and the second program being at least partially different in accordance with a difference between features of the first outer layer and the second outer layer.

Yet a further example comprises: providing a self-powered, remote sensor module carrying at least two sensors each operable to sense a characteristic of a different type and a wireless communication device; processing signals from the sensors with a neural network provided by the sensor module; and transmitting information from the sensor module with the wireless communication device, the information being at least partially determined from said processing.

Another example includes: providing a self-powered, remote sensor module carrying at least two sensors each operable to detect a characteristic of a different type; carrying the sensor module with a mobile person and/or a mobile object; processing signals from each of the sensors with an adaptive learning routine executed by the sensor module; and providing location information for the mobile person and/or the mobile object at least partially based on such processing.

In a further example, a sensor module is included that comprises: means for providing the sensor module in a number of layers coupled together to provide an integrated sensing unit with at least an outer one of the layers being interchangeable; means for sensing at least two different characteristics and providing corresponding sensor signals that is coupled to an outer one of the layers; means for processing the sensor signals with an adaptive learning routine; and means for wirelessly communicating information from the processing means to a receiving device.

While the inventions have been illustrated and described in detail in the drawings and foregoing description, the same is to be considered as illustrative and not restrictive in character, it being understood that only the preferred embodiments have been shown and described and that all equivalents, changes, and modifications that come within the spirit of the inventions described herein and by the following claims are desired to be protected.

What is claimed:

1. A modular general purpose sensor unit, comprising:
   a sensor array layer to receive and condition data from at least two different types of sensor;
   a general purpose intelligent processor and control layer to process at least said conditioned data and produce output data derived from said conditioned data, said processor and control layer including a reprogrammable memory for storing application specific software to control the operation of said processor and control layer, said output data being at least partially different from said conditioned data;
   a power layer for providing power to said sensor array layer and said processor and control layer;
   wherein said sensor array layer, said processor and control layer, and said power layer are layered to form a sensor module.

2. The modular general purpose sensor unit of claim 1, further comprising a communications layer for transmitting and receiving information to and from said sensor module, said sensor module including said communications layer.

3. The modular general purpose sensor unit of claim 2, wherein said sensor module includes a data port for receiving application specific software to be stored in said memory.

4. The modular general purpose sensor unit of claim 2, wherein said memory can be programmed to perform a different application with application specific software received by said communications layer.

5. The modular general purpose sensor unit of claim 2, wherein said communications layer receives other sensor output data from another sensor module.

6. The modular general purpose sensor unit of claim 2, further comprising a removable passive layer including a plurality of types of sensors thereon, said removable passive layer being configured for a specific application, said removable passive layer further adapted to be placed in communication with said sensor array layer of said sensor module.

7. The modular general purpose sensor unit of claim 6, wherein said smart sensor module can be reconfigured for a different application by replacing said removable passive layer with a second removable passive layer adapted to a second specific application and reprogramming said memory with second software adapted to said second specific application.

8. The modular general purpose sensor unit of claim 6, wherein said passive layer includes microfluidics channels and further comprising a process control layer to control fluid flow through said microfluidics channels on said passive layer by non-contact actuation.

9. The modular general purpose sensor unit of claim 6, wherein said output data is used by said sensor module to adjust a parameter being monitored.

10. The modular general purpose sensor unit of claim 1, wherein said two different types of sensors are chosen from a group including sensors that respond to temperature, pressure, vibration, electric fields, magnetic fields, optical irradiation, particle radiation, thermal radiation, momentum, acceleration, shock, flow, viscosity, density, mass, shear strain, conductivity, impedance, sound, ultrasound, specific organic elements, inorganic chemical elements, inorganic chemical compounds, inorganic chemical complexes in liquid gas, inorganic chemical in solid phases, proteins, enzymes, antigens, antibodies, other DNA fragments, genes and olignonucleotides.

11. The modular general purpose sensor unit of claim 10, wherein said two different types of sensors are included on a removable passive layer in communication with said sensor array layer of said unitary smart sensor module.

12. A sensor communication network, comprising: a plurality of general purpose smart sensor devices, each comprising:
  a sensor array layer to receive and condition data from at least two different types of sensor;
  a general purpose intelligent processor and control layer to process at least said conditioned data and produce output data derived from said conditioned data, said processor and control layer including a reprogrammable memory for storing application specific software to control the operation of said processor and control layer, said output data being at least partially different from said conditioned data;
  a power layer for providing power to said sensor array layer and said processor and control layer;
  wherein said sensor array layer, said processor and control layer, and said power layer form a sensor module;
  a central station for receiving said data; and
  wherein said output data from each of said smart sensor devices is communicated to said central station.

13. The sensor communication network of claim 12, additionally including:
  a plurality of node controllers, each node controller interacting with a portion of said plurality of general purpose smart sensor devices; and
  at least one site node controller in communication with said plurality of node controllers and with said central station.

14. The sensor communication network of claim 13, wherein at least a portion of said smart sensor devices communicate with at least one of said node controllers using a communication system chosen from the group including: the BLUETOOTH protocol, active RF communications and passive RF communications.

15. The sensor communication network of claim 13, wherein at least a portion of said node controllers communicate with said site node controller using a communication system chosen from the group including long range RF, cell phone, satellite link, land wire, fiber optics, IR links, internet links.

16. A method, comprising:
  performing a first sensing application with a sensing device, the sensing device including a power source, a processor, a wireless communication device, a first layer to perform sensing with two or more sensors each of a different type, and a memory including first application programming corresponding to one or more features of the first layer;
  interchanging the first layer of the sensing device with a second layer, the second layer including at least one feature different from the one or more features of the first layer, the memory including second application programming corresponding to the at least one feature of the second layer; and
  performing a second sensing application with the sensing device after said interchanging, the second application being different than the first application.

17. The method of claim 16, wherein the power source, the processor, and the wireless communication device are each carried on a different one of a number of layered carriers coupled together to provided an integral sensing subassembly.

18. The method of claim 16, which includes wirelessly communicating first information from the sensing device for the first sensing application and second information from the sensing device for the second sensing application.

19. The method of claim 16, wherein the sensors are carried in a sensor layer and said providing includes reprogramming the memory before said performing the second sensing application.

20. The method of claim 19, wherein the first layer is in the form of a first passive layer that cooperates with the sensor layer to provide a first sensing configuration and the second layer is in the form of a second passive layer that cooperates with the sensor layer to provide a second sensing configuration.

21. The method of claim 16, which includes processing information from the sensors with a neural network.

22. A method, comprising:
  providing a plurality of sensing device subassemblies each including a power source, a processor, a wireless communication device, and two or more sensors each of a different type;
  coupling a first outer layer to one of the subassemblies to provide a sensing device for a first application;
  coupling a second outer layer to another of the subassemblies to provide a sensing device for a second application different than the first application; and
  executing a first program with the sensing device for the first application and a second program with the sensing device for the second application, the first program and the second program being at least partially different in accordance with a difference between features of the first outer layer and the second outer layer.

23. The method of claim 22, wherein said first outer layer and said second outer layer are each passive.

24. The method of claim 22, which includes performing an actuation with the sensing device.

25. The method of claim 22, wherein the power source, the processor, the wireless communication device, and the sensors are each carried on a different one of a corresponding number of layered carriers coupled together for each of the subassemblies.

26. The method of claim 22, wherein the first program includes an adaptive learning routine.

27. The method of claim 22, wherein the first outer layer includes microfluidics channels and which includes controlling fluid flow through the microfluidics channels by non-contact actuation.

28. A method, comprising:

providing a self-powered, remote sensor module carrying at least two sensors each operable to sense a characteristic of a different type and a wireless communication device;

processing signals from the sensors with a neural network provided by the sensor module; and transmitting information from the sensor module with the wireless communication device, the information being at least partially determined from said processing.

29. The method of claim 28, wherein the sensor module includes a processor defining the neural network.

30. The method of claim 28, wherein the sensor module comprises a first layer including a power source, a second layer including the wireless communication device, a third layer including the processor, and a fourth layer including the sensors.

31. The method of claim 28, wherein the sensor module is one of a plurality of the sensor modules in wireless communication with a node.

32. The method of claim 28, which includes locating an object or person carrying the sensor module.

33. A method, comprising:

providing a self-powered, remote sensor module carrying at least two sensors each operable to detect a characteristic of a different type;

carrying the sensor module with one or more of a mobile person and a mobile object;

processing signals from each of the sensors with an adaptive learning routine executed by the sensor module; and providing location information for the one or more of the mobile person and the mobile object at least partially based on said processing.

34. The method of claim 33, wherein the adaptive learning routine includes an algorithm based on at least one of the group consisting of: a self-organization feature map, adaptive resonance theory, a feed forward neural network, a recurrent neural network, and Hopfield and bi-directional associative memory learning.

35. The method of claim 33, wherein the sensor module includes a processor defining a neural network that executes the adaptive learning routine.

36. The method of claim 33, wherein the sensor module comprises a first layer including a power source, a second layer including a wireless communication device, a third layer including a processor, and a fourth layer including the sensors.

37. The method of claim 36, wherein said providing includes wirelessly transmitting the location information with the wireless communication device.

38. The method of claim 33, wherein the sensor module is carried with the mobile object and the mobile object is in the form of a package.

39. The method of claim 33, wherein the sensor module is carried with the person and the sensor module detects one or more medical parameters of the person.

40. A self-powered, sensor module, comprising:

means for providing the sensor module in a number of layers coupled together to provide an integrated sensing unit with at least an outer one of the layers being interchangeable;

means for sensing at least two different characteristics and providing corresponding sensor signals, said sensing means being coupled to said outer one of the layers;

means for processing said sensor signals with an adaptive learning routine; and means for wirelessly communicating information from said processing means to a receiving device.

* * * * *